(12) United States Patent     (10) Patent No.:     US 7,487,527 B2
Ellis et al.                     (45) Date of Patent:    *Feb. 3, 2009

(54) INTERACTIVE TELEVISION PROGRAM GUIDE WITH SELECTABLE LANGUAGES

(75) Inventors: Michael D Ellis, Boulder, CO (US); W. Benjamin Herrington, Tulsa, OK (US); Steven C Williamson, Broken Arrow, OK (US); Kevin B Easterbrook, Monument, CO (US); Joshua A Rosenthol, East Norriton, PA (US); David M Rudnick, Denver, CO (US)

(73) Assignee: United Video Properties, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/353,394

(22) Filed: Feb. 13, 2006

(65) Prior Publication Data

US 2006/0143655 A1    Jun. 29, 2006

Related U.S. Application Data

(63) Continuation of application No. 09/354,602, filed on Jul. 16, 1999, now Pat. No. 7,051,360.

(60) Provisional application No. 60/110,262, filed on Nov. 30, 1998.

(51) Int. Cl.
    *H04N 5/445*    (2006.01)
(52) U.S. Cl. ........................... 725/38; 725/40; 725/136; 725/137; 348/461; 348/468; 348/569
(58) Field of Classification Search ............. 725/37–61, 725/137–139; 348/461, 462, 569
    See application file for complete search history.

(56) References Cited

U.S. PATENT DOCUMENTS

| 4,486,897 A | 12/1984 | Nagai |
| 4,700,322 A | 10/1987 | Benbassat et al. |
| 4,805,014 A | 2/1989 | Sahara et al. |

(Continued)

FOREIGN PATENT DOCUMENTS

EP    0299830 A1    1/1989

(Continued)

OTHER PUBLICATIONS

W3C Internationalization/Localization, Putting language attributes in HTML, pp. 1-2.*

*Primary Examiner*—Annan Q Shang
(74) *Attorney, Agent, or Firm*—Ropes & Gray LLP

(57) ABSTRACT

An interactive television program guide is provided. The interactive television program guide provides a user with the opportunity to select a language for playing television programming and displaying program guide text. Television program audio in the desired language may be obtained from a SAP or digital audio track and played in the selected language. Television related information in the desired language may be obtained from a digital track. If television program audio or related information is not provided in the selected language, the program guide may use a default language. The program guide may coordinate program guide display screen text with languages available for television programs when the programs are broadcast to users.

20 Claims, 19 Drawing Sheets

U.S. PATENT DOCUMENTS

| | | | |
|---|---|---|---|
| 5,442,389 A | | 8/1995 | Blahut et al. |
| 5,519,780 A | * | 5/1996 | Woo et al. .................... 725/137 |
| 5,576,951 A | | 11/1996 | Lockwood |
| 5,579,057 A | | 11/1996 | Banker et al. |
| 5,585,838 A | | 12/1996 | Lawler et al. |
| 5,585,866 A | | 12/1996 | Miller et al. |
| 5,589,892 A | | 12/1996 | Knee et al. |
| 5,600,364 A | | 2/1997 | Hendricks et al. |
| 5,644,775 A | | 7/1997 | Thompson et al. |
| 5,740,075 A | * | 4/1998 | Bigham et al. .............. 709/229 |
| 5,751,282 A | | 5/1998 | Girard et al. |
| 5,760,821 A | | 6/1998 | Ellis et al. |
| 5,805,153 A | * | 9/1998 | Nielsen ...................... 725/37 |
| 5,808,694 A | * | 9/1998 | Usui et al. .................... 725/49 |
| 5,861,881 A | | 1/1999 | Freeman et al. |
| 5,870,084 A | | 2/1999 | Kanungo et al. |
| 5,966,637 A | | 10/1999 | Kanungo et al. |
| 5,973,679 A | * | 10/1999 | Abbott et al. ............... 715/203 |
| 5,990,927 A | * | 11/1999 | Hendricks et al. ........... 725/132 |
| 5,995,159 A | | 11/1999 | Bae et al. |
| 6,023,267 A | * | 2/2000 | Chapuis et al. ............. 715/810 |
| 6,046,778 A | | 4/2000 | Nonomura et al. |
| 6,061,646 A | | 5/2000 | Martino et al. |
| 6,115,057 A | | 9/2000 | Kwoh et al. |
| 6,138,086 A | | 10/2000 | Rose et al. |
| 6,166,778 A | * | 12/2000 | Yamamoto et al. .......... 348/569 |
| 6,182,099 B1 | | 1/2001 | Nakasato |
| 6,204,885 B1 | * | 3/2001 | Kwoh .......................... 348/564 |
| 6,212,201 B1 | * | 4/2001 | Hinderks et al. ............ 370/468 |
| 6,215,467 B1 | | 4/2001 | Suga et al. |
| 6,240,170 B1 | | 5/2001 | Shaffer et al. |
| 6,240,555 B1 | | 5/2001 | Shoff et al. |
| 6,367,079 B1 | * | 4/2002 | De Vos et al. ................. 725/86 |
| 6,370,498 B1 | | 4/2002 | Flores et al. |
| 6,426,779 B1 | | 7/2002 | Noguchi et al. |
| 6,463,585 B1 | | 10/2002 | Hendricks et al. |
| 6,487,365 B2 | | 11/2002 | Cookson et al. |
| 6,515,680 B1 | | 2/2003 | Hendricks et al. |
| 6,532,442 B1 | | 3/2003 | Schumacher et al. |
| 6,539,548 B1 | * | 3/2003 | Hendricks et al. ........... 725/109 |
| 6,820,278 B1 | | 11/2004 | Ellis |
| 7,240,356 B2 | * | 7/2007 | Iki et al. ....................... 725/48 |
| 2002/0122137 A1 | * | 9/2002 | Chen et al. ................. 348/552 |
| 2003/0149988 A1 | | 8/2003 | Ellis et al. |

FOREIGN PATENT DOCUMENTS

| | | |
|---|---|---|
| EP | 0478926 B1 | 4/1992 |
| EP | 0589068 B1 | 3/1994 |
| EP | 0744866 A2 | 11/1996 |
| EP | 0 822 713 B1 | 6/2003 |
| WO | WO 80/00209 | 2/1980 |
| WO | WO 97/18673 | 5/1997 |
| WO | WO 97/42763 | 11/1997 |
| WO | WO 99/03267 | 1/1999 |

\* cited by examiner

INTERACTIVE TELEVISION PROGRAM GUIDE WITH SELECTABLE LANGUAGES

This application is a continuation of U.S. patent application Ser. No. 09/354,602 filed Jul. 16, 1999, which is hereby incorporated by reference herein in its entirety, and which claims the benefit of United States provisional application No. 60/110,262, filed Nov. 30, 1998.

BACKGROUND OF THE INVENTION

This invention relates to interactive television program guide systems, and more particularly, to interactive television program guide systems in which users may select a desired language for playing television programming and displaying program guide display screen text.

Cable, satellite, and broadcast television systems provide viewers with a large number of television channels. Users have traditionally consulted printed television program schedules to determine the programs being broadcast at a particular time. More recently, interactive television program guides have been developed that allow television program information to be displayed on a user's television.

Interactive television program guides allow the user to navigate through television program listings using a remote control. In a typical program guide, various groups of television program listings are displayed in predefined or user-defined categories. Listings are typically displayed in a list, grid, or table. Interactive television program guides are typically implemented on set-top boxes located in the homes of users. A typical set-top box is connected to the user's television and videocassette recorder. Program guides that run on personal computers or that allow program guide information to be obtained using the Internet are also available.

Current television programming service providers typically provide television programing to customers that may live across a wide geographical area. It is not uncommon for a television programming service provider to provide television programming to a number of viewers who may not speak the same language, or who prefer speaking in a language different from the primary language of the geographical area in which the viewers live.

Some current interactive television program guides provide users with the ability to select languages for television programming from digital audio tracks on a digital channel. These interactive television program guides provide the user with the opportunity to select a language. The interactive program guide informs firmware in the user's set-top box of the selected language. A digital component selector in the set-top box then instructs a packet filter to filter out unwanted digital audio tracks based on unique packet identifiers ("PIDs") that identify each of the tracks. The audio track with the PID that corresponds to the selected language is played by the set-top box on the user's television.

Current program guides do not provide for activation and deactivation of a secondary audio program (SAP) based on the language of the audio carried on the SAP. Current program guides also do not allow user to designate a single language for both displaying program guide display screen text (e.g., help text, program listings grid text, button labels, etc.), and for playing audio.

It would therefore be desirable to provide an interactive television program guide that allows a user to select a language for playing analog program audio and for displaying program guide display screen text. It would also be desirable to provide a program guide that allows a user to select a language in which both audio is played and program guide text is displayed. It would also be desirable to coordinate the language in which program guide display screen text is displayed with languages that are available to the user for playing television programming. For example, it would be desirable to have television program listings for a particular program displayed in a user selected language if the program, when actually broadcasted, has audio available in the selected language. Otherwise, the program listing for that program may be displayed and the program played in a default language.

It is therefore an object of the present invention to provide an interactive television program guide system that allows a user to select a language in which both programming audio is played and program guide display screen text is displayed.

It is another object of the present invention to provide an interactive television program guide that allows a user to select languages for playing television program audio provided on analog tracks.

It is another object of the present invention to provide an interactive television program guide that coordinates the language in which program guide display screen text is displayed with languages available for television programming when the television programming is broadcasted.

It is another object of the present invention to provide an interactive television program guide system in which-program guide display screen text in a selected language is downloadable by the program guide.

SUMMARY OF THE INVENTION

These and other objects of the present invention are accomplished in accordance with the principles of the present invention by providing an interactive television program guide system having a main facility (e.g., a satellite uplink facility) that provides program guide data from a data source to a number of television distribution facilities (e.g., cable system headends, broadcast distribution facilities, satellite television distribution facilities, or any other suitable television distribution facilities). The program guide data transmitted by the main facility to the television distribution facilities includes television programming data (e.g., titles, channels, descriptions and content information, rating information, or any other information associated with television programming), and additional data for services other than television program listings. (e.g., help text, weather information, sports information, associated Internet web links, etc.). The television distribution facilities distribute the program guide data to the interactive television program guides of a number of users.

The interactive television program guide of the present invention is implemented on interactive program guide equipment that may include user television equipment (e.g., a set-top box and television combination) located at the user's home. The interactive program guide equipment may also include program guide distribution equipment located at a television distribution facility.

Program guide display screens may be used to provide a user with the opportunity to select the language in which television programming is played by the user's television equipment and in which program guide display screen text is displayed using the interactive television program guide. Displaying program guide display screen text in a selected language may also include displaying text in a date format, time format, currency format, parental rating format or other format particular to a selected language or country that uses a selected language. The interactive television program guide may store a language attribute identifying the selected language. A default program guide language attribute may also be stored by the program guide. The default program guide language attribute may, for example, be preprogrammed into the program guide or supplied as program guide data. Default program languages for individual programs may also be supplied as program guide data.

The program guide may also provide users with an opportunity to select an alternate language in which program guide display screen text is displayed and programming audio played. For example, the user may select Spanish as a primary language and English as an alternate language. In another suitable approach, the program guide may pick an alternate language based on the primary language selected by the user. If the user selects Canadian English for the primary language, for example, the program guide may select U.S. English as an alternate language. As used herein, "selected language" is intended to include a primary language selected by the user, a secondary language selected by the user or the program guide, or any suitable combination thereof.

In practice, the languages available for playing programming audio may not be the same as the languages available for displaying program guide display screen text. When programming audio is not available in the selected language but program guide display screen text is, the program guide may play programming audio in a related language. For example, if a user selects Canadian English as the user's primary language, the program guide may display program guide display screen text in Canadian English and play programming audio in U.S. English when there is no Canadian English audio track available for the program.

The interactive program guide informs hardware in the user's television equipment of the selected language or languages. The user's television equipment plays television programs with audio from digital or analog audio tracks that contain audio in the selected languages. If audio in the primary or alternate language is not available on any provided digital or analog audio track, the user television equipment plays the television programs in the default program guide language or, if applicable, the default program languages. Data or other information that is provided, for example subtitles, may also be displayed in the selected language.

The interactive television program guide of the present invention may provide a user with the opportunity to request television programs such as in, for example, a video-on-demand (VOD) system. The interactive television program guide may inform equipment at the television distribution facility of the primary, alternate and default languages (or any suitable combination thereof) when, for example, a request is made by the program guide to the television distribution facility for a program. The television distribution facility may respond by providing the requested television program to the user's television equipment with only a single audio track containing audio in the selected language. Eliminating unnecessary audio tracks may lessen the bandwidth requirements for transmitting programming signals from the television distribution facility to a user's television equipment.

The interactive television program guide of the present invention may also provide program guide display screen text to the user in the selected language. As used herein, interactive program guide display screen text may include help text, program guide data text, program guide text, or any suitable combination thereof. Help text is displayed in response to the user selection of a help feature. Help text may be downloaded as part of the program guide data provided by the main facility or may be part of the program guide.

Program guide data text is text included in the downloaded program guide data and included in program guide display screens. Program guide data text may include, for example, programming information (e.g., titles, channels, descriptions and content information, rating information, or any other text based information associated with television programming), text for advertisements, or any other suitable text-based information.

Program guide text is text that is programmed into the program guide and that is generally not provided as part of the program guide data. Program guide text may be downloaded when, for example, changing languages of the program guide. Program guide text may include, for example, screen titles, screen element labels (e.g., button labels, program list labels, program grid labels, etc.), text that indicates or otherwise describes program guide functionality, or any other text that may be considered part of the program guide itself and displayed in program guide display screens.

The interactive program guide may filter help text and program guide data text from the program guide data based on the language attributes. Help text and program guide data text in the selected and default program guide languages may be provided to the interactive television program guide by the television distribution facilities using any suitable approach. The text may, for example, be provided continuously by the television distribution facilities in different languages and filtered by the program guide, may be downloaded by the program guide on request (e.g., in a suitable client-server approach), or may be obtained using any other suitable approach.

Program guide text may be changed in any suitable fashion. Program guide text for all available languages may, for example, be compressed using any suitable compression method and stored as part of the program guide application. When a different language is selected by the user, the program guide may, for example, decompress the appropriate program guide text and display it accordingly. Alternatively, the program guide may, for example, download program guide text on demand from the television distribution facility (e.g., as in a suitable client-server approach) using the stored language attribute. Program guide text may also be provided as part of a continuous data stream and filtered locally. Any suitable combination of these methods may also be used. For example, the program guide may store program guide text in popular languages and may download program guide text when a less popular language is selected. For similar languages, (e.g., Canadian English and U.S. English), the program guide may download program guide text in one language as a reference, and the differences in the second language. Making program guide text downloadable via a continuous data stream, periodic stream, server, or any other source, may allow a single version of the program guide to be distributed over a wide geographical area (e.g., nationally) and the language of the guide to be localized (e.g., apropos to the languages of local residents).

If desired, only portions of the program guide display screen text may be changed by coordinating the language in which program guide display screen text is displayed with the languages available for television programming available to the user. For example, a particular program may not have an audio data track for the selected language. The program may be played and its associated program listings may be displayed, for example, in a default program guide language or default program language, while programs and associated program listings that have audio or data tracks with content in the selected language may be played and displayed in the selected language. The same may be true for subtitles, music information, programming information, other information included in a digital track, or any other program guide data text or program guide text that may be played by the user's television equipment. The same may be true for television program audio. Programs, their audio, and any associated program data or programming guide data may be recorded in a selected or default language.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
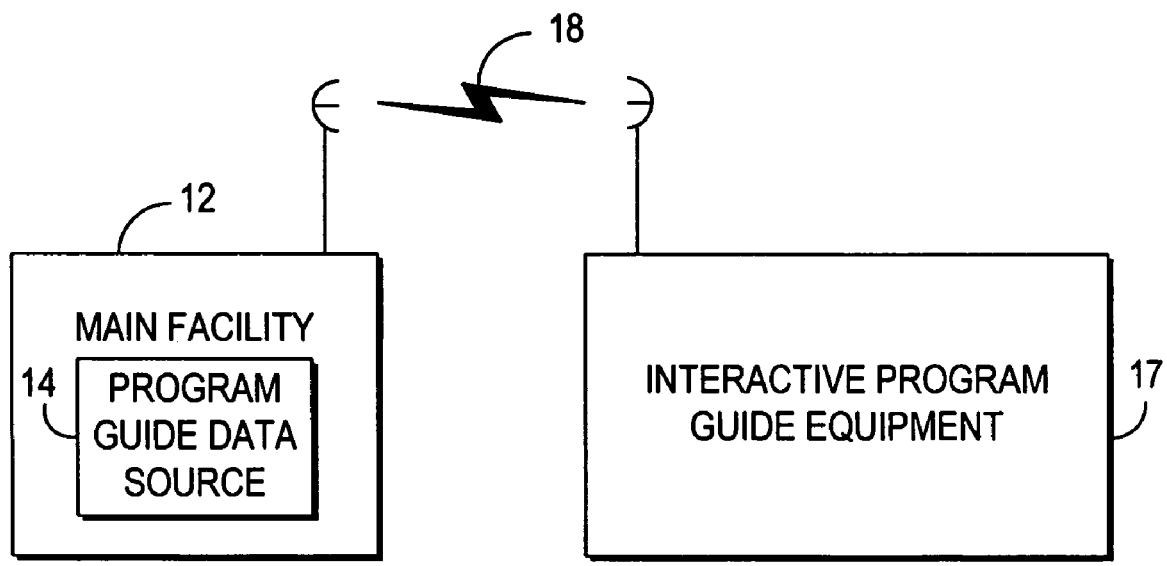
FIG. 1 is a schematic block diagram of an illustrative system in accordance with the present invention.

An illustrative system 10 in accordance with the present invention is shown in FIG. 1. Main facility 12 provides program guide data from program guide data source 14 to interactive program guide equipment 17 via communications link 18. There are preferably numerous pieces or installations of interactive program guide equipment 17, although only one is shown in FIG. 1 to avoid over-complicating the drawing.

Link 18 may be a satellite link, a telephone network link, a cable or fiber optic link, a microwave link, an Internet link, a combination of such links, or any other suitable communications link. If it is desired to transmit video signals over link 18 in addition to data signals, a-relatively high bandwidth link such as a satellite link may generally be preferred to a relatively low bandwidth link such as a telephone line.

The program guide data transmitted by main facility 12 to interactive program guide equipment 17 may include television programming data (e.g., program times, channels, titles, and descriptions) and other data for services other than television program listings (e.g., help text, pay-per-view information, weather information, sports information, associated Internet web links, etc.). The program guide data may be compressed if desired.

Figure 2A:
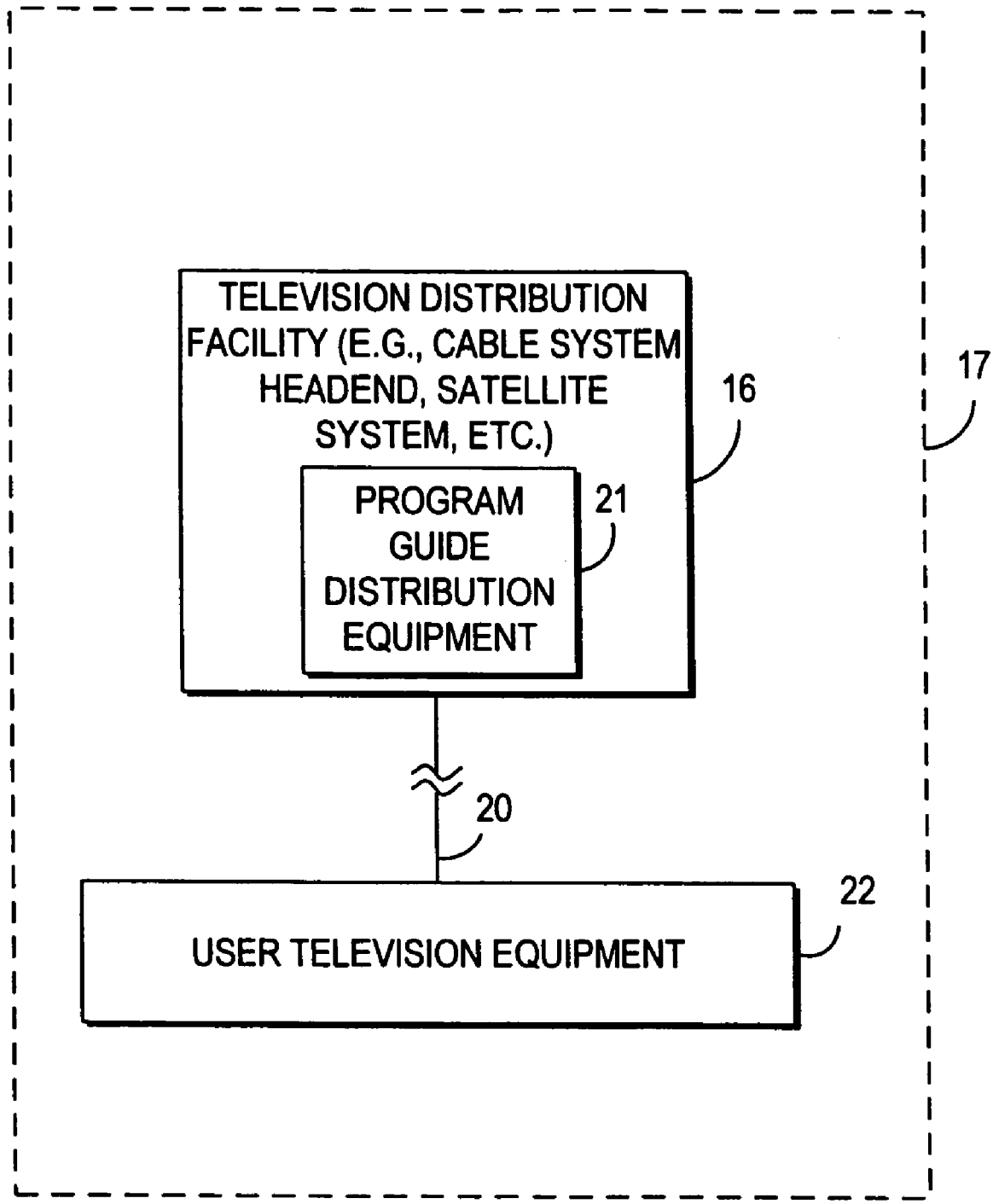
FIGS. 2a and 2b show illustrative arrangements for the interactive program guide equipment of FIG. 1 in accordance with the principles of the present invention.
Figure 2B:
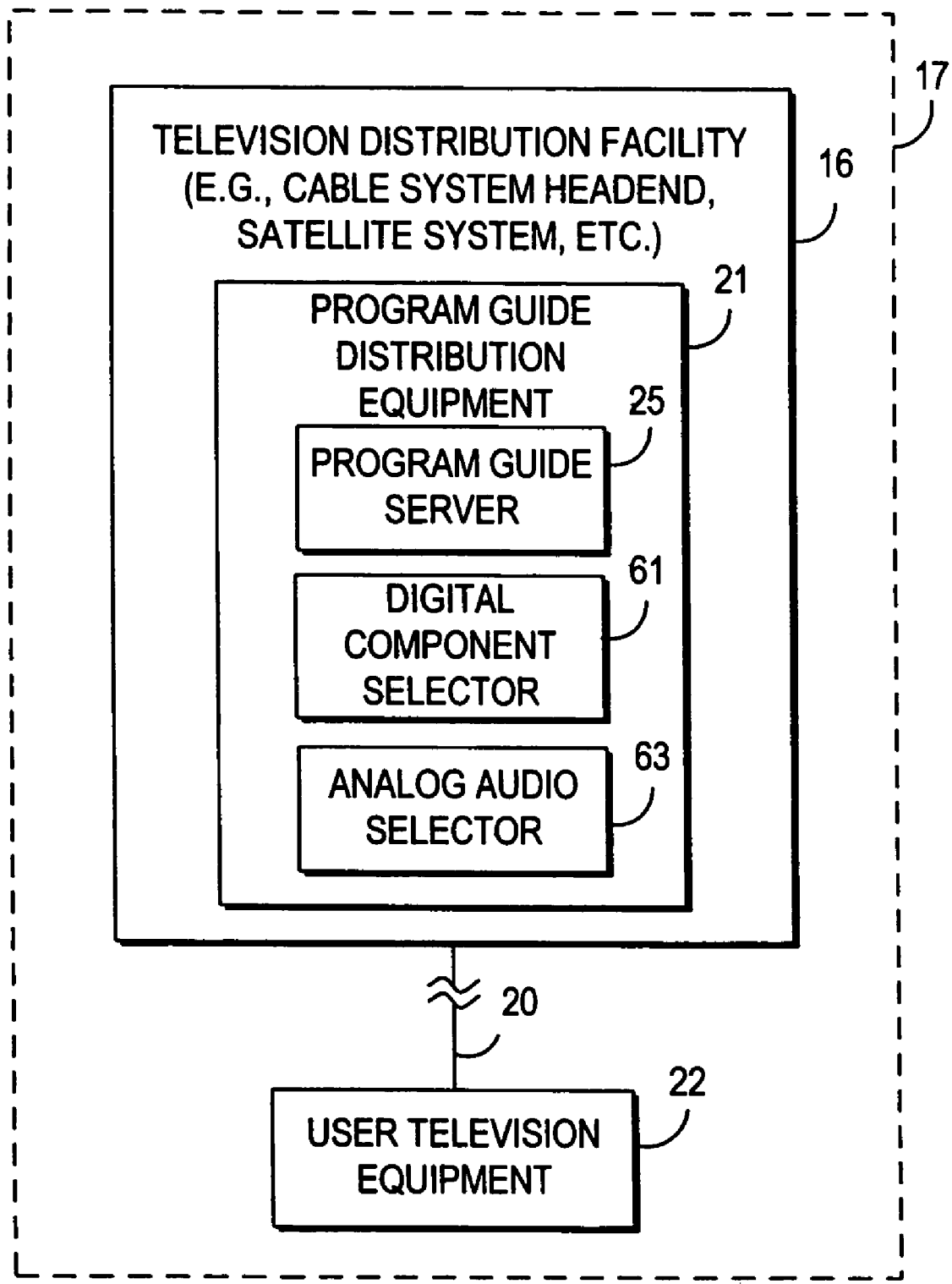

An interactive television program guide is implemented on interactive program guide equipment 17. Two illustrative arrangements for interactive program guide equipment 17 are shown in FIGS. 2a and 2b. Interactive program guide equipment 17 may include program guide distribution equipment 21 located at television distribution facility 16, and user television equipment 22.

The interactive television program guide may run totally on user television equipment 22 as shown in FIG. 2a, or may run partially on user television equipment 22 and partially on program guide distribution equipment 17 using a suitable client-server or distributed processing approach as shown in FIG. 2b. Television distribution facility 16 may be any suitable distribution facility (e.g., a cable system headend, a broadcast distribution facility, a satellite television distribution facility, or any other suitable type of television distribution facility). Television distribution facility 16 may have program guide distribution equipment 21. Program guide distribution equipment 21 may distribute program guide data that television distribution facility 16 received from main facility 12 to multiple users via communications paths 20.

Program guide distribution equipment 21 of FIGS. 2a and 2b may be any equipment suitable for providing program guide data to user television equipment 22. Program guide distribution equipment 21 may include, for example, suitable transmission hardware for distributing program guide data on a television channel sideband, in the vertical blanking interval of a television channel, using an in-band digital channel, using an out-of-band digital signal, or by any other suitable data transmission technique. Analog or digital video signals (e.g., television programs) may also be provided by program guide distribution equipment 21 to user television equipment 22 over communications paths 20 on multiple television channels.

Communications path 20 preferably has sufficient bandwidth to allow television distribution facility 16 to distribute television programming to user television equipment 22. There are typically multiple pieces of user television equipment 22 and multiple associated communications paths 20, although only one piece of user television equipment 22 and communications path 20 are shown in FIGS. 2a and 2b to avoid over complicating the drawing. If desired, television programming may be provided over separate communications paths (not shown).

FIG. 2b shows an illustrative arrangement for interactive program guide equipment 17 in a client-server based or distributed interactive program guide system. As shown in FIG. 2b, program guide distribution equipment 21 may include program guide server 25. Program guide server 25 may be any suitable software, hardware, or combination thereof for providing a client-server based program guide. Program guide server 25 may, for example, generate requested program guide display screens as digital frames and distribute the frames to user television equipment 22 for display by an interactive program guide client implemented on user television equipment 22. Program guide systems in which digital frames are distributed to users are described, for example, in Marshall et al. U.S. patent application Ser. No. 09/330,501, filed Jun. 11, 1999, which is hereby incorporated by reference herein in its entirety. Alternatively, program guide server 25 may run a suitable database engine (e.g., SQL Server by Microsoft) and provide program guide data in response to queries generated by a program guide client implemented on user television equipment 22. If desired, program guide server 25 may be located at main facility 12 (not shown).

In still another embodiment, program guide distribution equipment 21 may include suitable hardware (not shown) on which a first portion or version of the interactive television program guide is implemented. A second portion or version of the program guide may be implemented on user television equipment 22. The two versions or portions of the interactive program guide may communicate using any suitable peer-to-peer communications scheme (e.g., messaging, remote procedure calls, etc.) and perform interactive program guide functions distributively between television distribution facility 16 and user television equipment 22.

Television distribution facility 16 may supply programs to user television equipment 22 in response to demands made by the user using user television equipment 22. Any suitable video-on-demand (VOD) approach may be used. Program guide server 25 may receive, along with video demands from user television equipment 22, identifiers that identify the selected language and the default program guide language of the interactive television program guide.

Program guide distribution equipment 21 of FIG. 2b may include digital component selector 61 and analog audio selector 63. Digital component selector 61 may be any hardware, software, or combination thereof suitable for determining which digital audio, data, or other tracks contain audio, data, or other information in the language selected by the user or, alternatively, in the default language of the interactive program guide. Analog audio selector 63 may be any hardware, software, or combination thereof suitable for determining which analog audio track contains audio in the selected language or, alternatively, in the default program guide language.

Program guide distribution equipment 21 may distribute programs to user television equipment 22 with only an analog audio track (if distributed on an analog channel), or with only digital audio, data, or other information tracks (if distributed on a digital channel), that have audio, data, or other information in the selected or default languages as determined by analog audio selector 63 or digital component selector 61, respectively. Sending audio, data, or other information in only one language requires less bandwidth than would sending the audio, data, or other information in multiple languages and having unwanted languages filtered at user television equipment 22. This approach is specially useful in systems, such as VOD systems, where many users request video over multiple communication paths 20.

Each user has user television equipment 22 for displaying, for example, television programming and program guide display screens using the interactive television program guide. Program guide data may be distributed by program guide distribution equipment 21 to user television equipment 22 using any suitable scheme. For example, program guide data may be provided in a continuous stream, or may be transmitted periodically at a suitable time interval (e.g., once per hour). If transmitted continuously, it may not be necessary to store the data locally at user television equipment 22. Rather, user television equipment 22 may extract data "on the fly" as it is needed. If desired, television distribution facility 16 may poll user television equipment 22 periodically for certain information (e.g., pay program account information or information regarding programs that have been purchased and viewed using locally-generated authorization techniques). Program guide data provided by program guide server 25 may also be distributed to user television equipment 22 by program guide distribution equipment 21. If desired, the program guide data may be compressed by main facility 12 or television distribution or facility 16, and uncompressed by the program guide.

For clarity, the present invention will be illustrated in connection with a system arrangement in which program guide data is distributed from a main facility to an interactive television program guide implemented on user television equipment via a television distribution facility. Other suitable systems involve arrangements in which data is distributed to a program guide on user television equipment using other suitable distribution schemes, such as schemes involving data transmission over the Internet or the like. If desired, the interactive television program guide application may be implemented using a client-server architecture in which the primary processing power for the application is provided by a server located at, for example, the television distribution facility or the main facility (e.g., program guide server 25), and user television equipment 22 acts as a client processor, as in, for example, the system shown in FIG. 2b. A suitable distributed approach may also be used.

Figure 3:
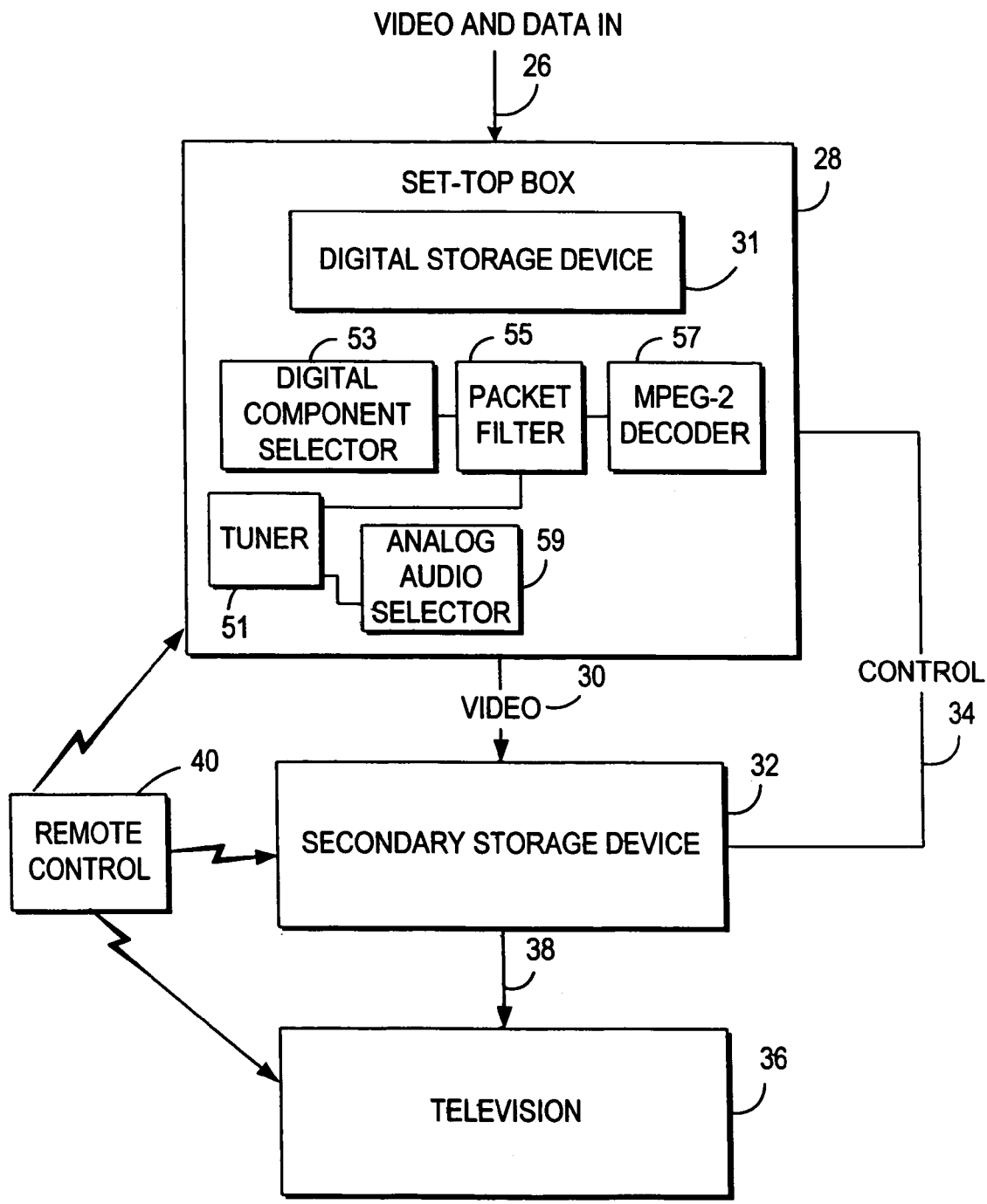
FIG. 3 is an illustrative schematic block diagram of the user television equipment of FIGS. 2a and 2b in accordance with the principles of the present invention.

An illustrative arrangement for user television equipment 22 is shown in FIG. 3. User television equipment 22 of FIG. 3 receives video, audio and data from television distribution facility 16 (FIG. 1) at input 26. During normal television viewing, tuner 51 of set-top box 28 tunes to a desired television channel based on inputs from the user on remote control 40. The signal for that television channel is then provided at video output 30. The signal supplied at output 30 is typically either a radio-frequency (RF) signal on a predefined channel (e.g., channel 3 or 4), or a analog demodulated video signal, but may also be a digital signal provided to television 36 on an appropriate digital bus (e.g., a bus using the Institute of Electrical and Electronics Engineers (IEEE) 1394 standard, (not shown)). The video signal at output 30 is received by optional secondary storage device 32. Set-top box 28 may also have digital component selector 53, packet filter 55, MPEG-2 decoder 57, and analog audio selector 59 (or any suitable combination thereof) for obtaining digital or analog audio from the signal received at input 26.

Secondary storage device 32 can be any suitable type of analog or digital program storage device or player (e.g., a videocassette recorder, a digital versatile disc (DVD) player, etc.). Program recording and other functions may be controlled by set-top box 28 using control path 34. If secondary storage device 32 is a videocassette recorder, for example, a typical control path 34 involves the use of an infrared transmitter coupled to the infrared receiver in the videocassette recorder that normally accepts commands from a remote control such as remote control 40. Remote control 40 may be used to control set-top box 28, secondary storage device 32, and television 36. Programs and their associated audio may be stored in a selected or default language if desired.

The interactive television program guide may run on set-top box 28, on television 36 (if television 36 has suitable processing circuitry and memory), or on a suitable analog or digital receiver connected to television 36. The interactive television program guide may also run cooperatively on both television 36 and set-top box 28. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

If desired, the user may record programs, associated program data, program guide data, or any suitable combination thereof in digital form on optional digital storage device 31. The programs, audio, associated program data, or program guide data may be stored in a selected or default language. Digital storage device 31 may be a writable optical storage device (such as a DVD player capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety.

Digital storage device 31 can be contained in set-top box 28 or it can be an external device connected to set-top box 28 via an output port and appropriate interface. If necessary, processing circuitry in set-top box 28 formats the received video, audio, and data signals into a digital file format. Preferably, the file format is an open file format such as the Motion Pictures Expert Group (MPEG) MPEG-2 standard. The resulting data is streamed to digital storage device 31 via an appropriate bus (e.g., a bus using the Institute Electrical and Electronics Engineers (IEEE) 1394 standard), and is stored on digital storage device 31.

Television 36 receives video and audio signals from secondary storage device 32 via communications path 38. The signals on communications path 38 may either be generated by secondary storage device 32 when playing back a prerecorded storage medium (e.g., a videocassette or a recordable digital versatile disc), by digital storage device 31 when playing back a pre-recorded digital medium, may be passed through from set-top box 28, may be provided directly to television 36 from set-top box 28 if secondary storage device 32 is not included in user television equipment 22, or may be received directly by television 36. During normal television viewing, the signals provided to television 36 correspond to the desired channel to which the user has tuned with set-top box 28. The signals may also be provided to television 36 by set-top box 28 when set-top box 28 is used to play back information stored on digital storage device 31.

Figure 4:
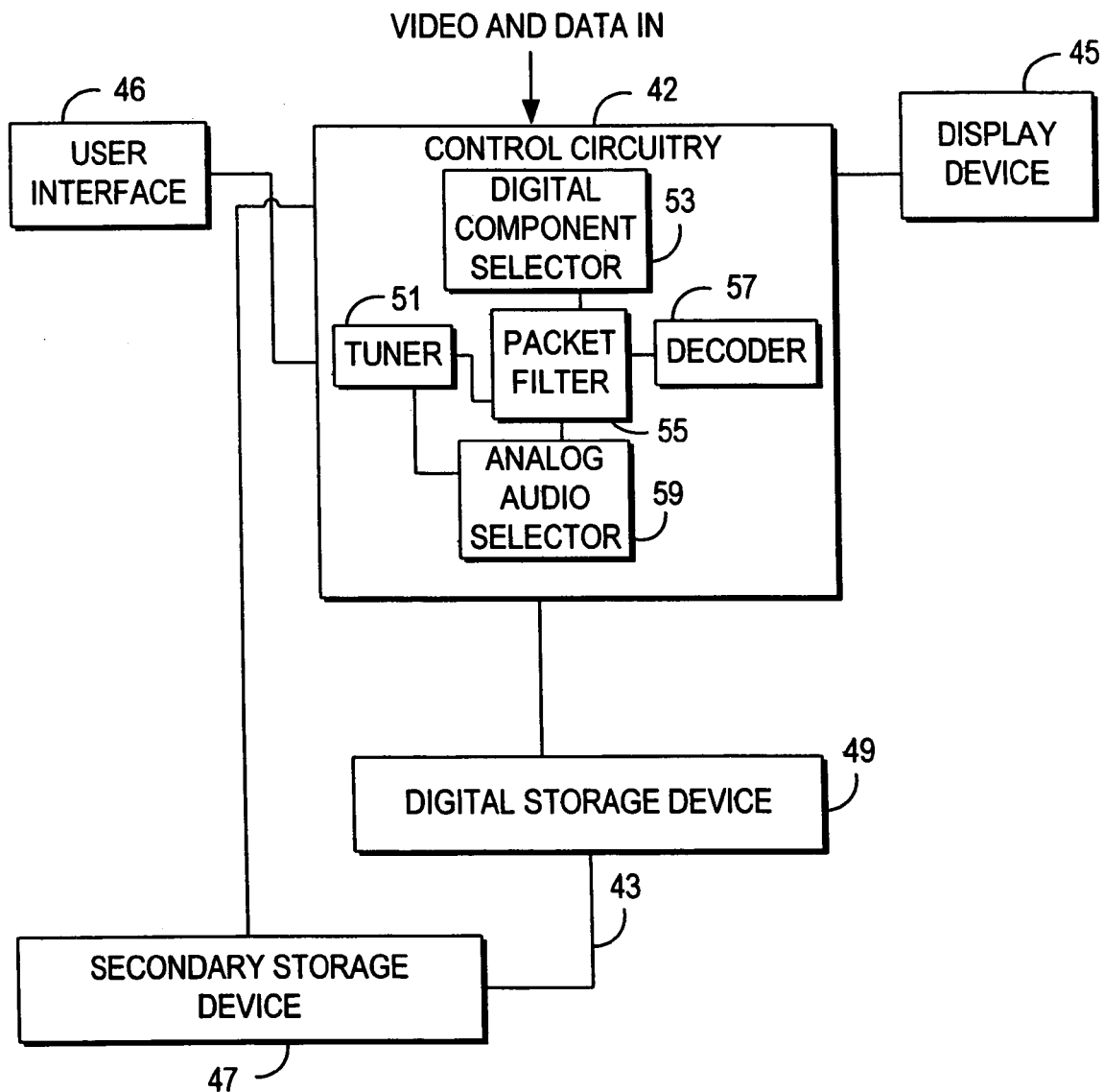
FIG. 4 is a generalized schematic block diagram of portions of the illustrative user television equipment of FIG. 3 in accordance with the principles of the present invention.

A more generalized embodiment of user television equipment 22 of FIG. 3 is shown in FIG. 4. As shown in FIG. 4, program guide data from television distribution facility 16 (FIG. 1) is received by control circuitry 42 of user television equipment 22. Control circuitry 42 may include circuitry suitable for tuning to digital or analog television signals as indicated by tuner 51. Control circuitry 42 may also include circuitry suitable for selecting different audio tracks from digital audio television channels, as is indicated by digital component selector 53, packet filter 55, and analog audio selector 59. Decoding circuitry for generating digital video may also be included, as is indicated by MPEG-2 decoder 57. The functions of control circuitry 42 may be provided using the set-top box arrangement of FIG. 3. Alternatively, these functions may be integrated into an advanced television receiver, personal computer television (PC/TV), or any other suitable arrangement. If desired, a combination of such arrangements may be used.

User television equipment 22 may also have secondary storage device 47 and digital storage device 49 for recording programming. Secondary storage device 47 can be any suitable type of analog or digital program storage device (e.g., a videocassette recorder, a digital versatile disc (DVD), etc.). Program recording and other functions may be controlled by control circuitry 42. Digital storage device 49 can be, for example, a writable optical storage device (such as a DVD player capable of handling recordable DVD discs), a magnetic storage device (such as a disk drive or digital tape), or any other digital storage device. If desired, programs may be recorded remotely at television distribution facility 16 or some other facility, making secondary storage device 47 and digital storage device 49 unnecessary. Systems in which programs are remotely recorded and played back are described, for example, in Ellis et al. U.S. patent application Ser. No. 09/332,244, filed Jun. 11, 1999, which is hereby incorporated by reference herein in its entirety. Programs, audio, associated program data, program guide data, or any suitable combination thereof, may be recorded by secondary storage device 47, digital storage device 49, or a remote server in a selected or default language if desired.

The user controls the operation of user television equipment 22 with user interface 46. User interface 46 may be a pointing device, wireless remote control, keyboard, touchpad, voice recognition system, or any other suitable user input device. To watch television, the user instructs control circuitry 42 to display a desired television channel on display device 45. To access the functions of the program guide, the user instructs the program guide implemented on interactive program guide equipment 17 to generate a main menu or other desired program guide display screen for display on display device 45.

When a user indicates a desire to access the interactive television program guide implemented on interactive program guide equipment 17 (e.g., by using a "menu" key on remote control 40), the program guide generates an appropriate program guide display screen for display on monitor 45. A main menu screen, for example, such as illustrative main menu screen 100 of FIG. 5, may be generated that provides the user with access to various program guide functions. Main menu screens may also display any suitable graphic or other display screen entity.

Figure 5:
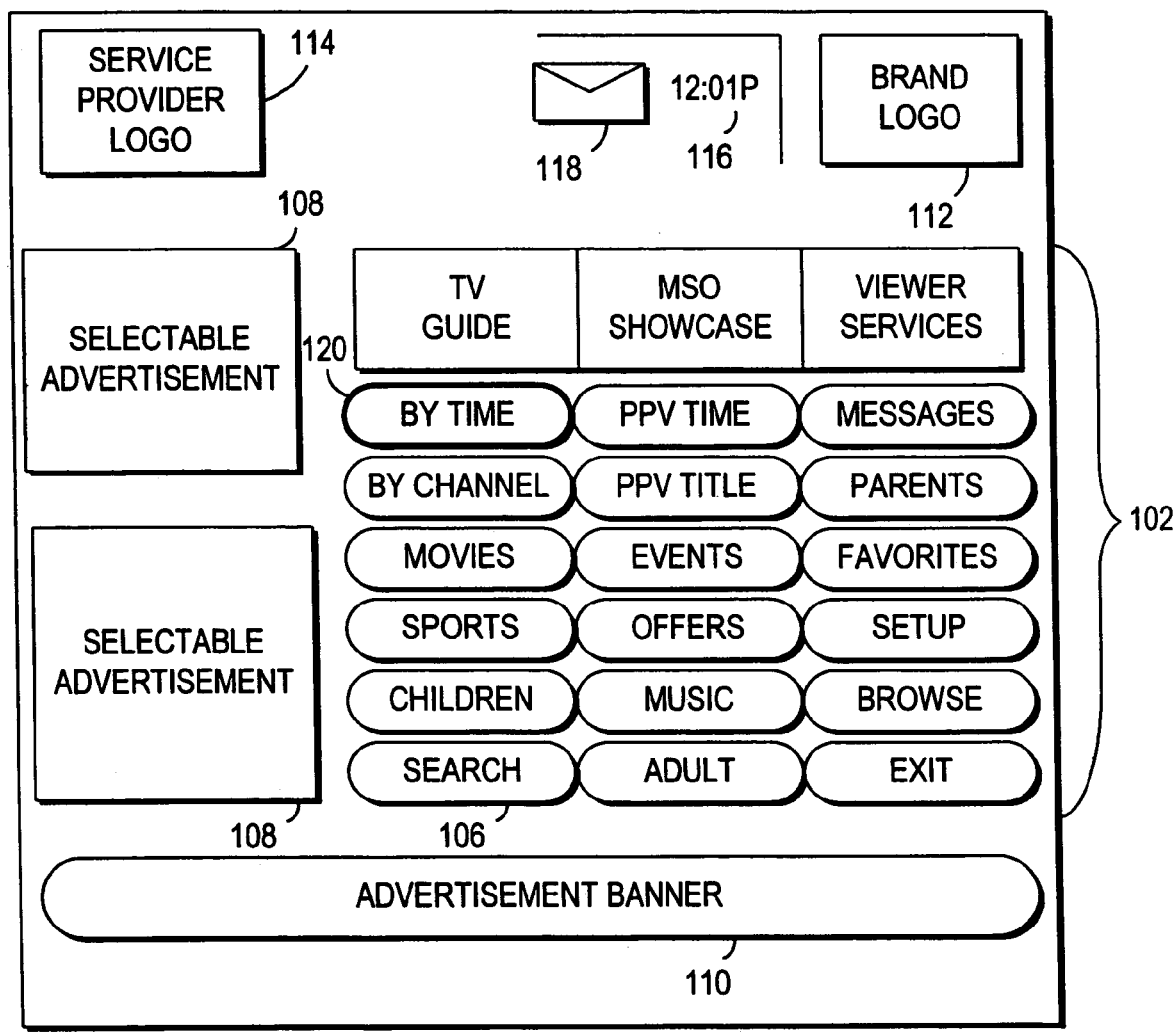
FIGS. 5-11 are illustrative program guide display screens in accordance with the principles of the present invention.

Illustrative main menu screen 100 of FIG. 5, for example, may include menu 102 of selectable program guide features 106. If desired, the program guide features 106 may be organized according to feature type. Menu 102, for example, organizes program guide features 106 into three columns wherein the column labeled "TV GUIDE" is for listings related features, the column labeled "MSO SHOWCASE" is for multiple system operator (MSO) related features, and the column labeled "VIEWER SERVICE" is for viewer related features. The interactive television program guide may generate a suitable display screen for a particular program guide feature in response to the user selection of any selectable program guide feature 106.

Main menu screen 100 may also include one or more selectable advertisement graphics 108. Selectable advertisement graphics 108 may, for example, advertise pay-per-view programs. In response to the user selection of a selectable advertisement graphic 108, the program guide may display information (e.g., pay-per-view information) for what is advertised by the graphic. Pure text advertisements may be presented using selectable advertisement graphics 108 if desired, or may be more suitably presented using selectable advertisement banner 110.

Main menu screen 100 may also include other graphics. The brand of the program guide product may be indicated, for example, using a product brand logo graphic such as product brand logo graphic 112. The service provider may be indicated, for example, using a service provider logo graphic such as service provider logo graphic 114. The current time may be displayed using clock 116. In addition, a suitable indicator such as indicator graphic 118 may be used to indicate to the user that a message is waiting for the user if the program guide provides messaging or a TV-Mail feature.

The interactive program guide may provide the user with the opportunity to view television program listings. A user may indicate a desire to view program listings by, for example, positioning highlight region 120 over a desired program guide feature. Alternatively, the program guide may present program listing in response to the user pressing a key (e.g., a "guide" key) on remote control 40. In response to the user indicating a desire to view television programming information, the program guide may generate an appropriate program listings screen for display on monitor 45. A program listings screen may contain one or more lists of programs organized according to multiple organization criteria and sorted in various ways.

The program listings screen may be overlaid over a program being viewed by the user or overlaid over a portion of the program in a "browse" mode. The program guide may, for example, provide the user with the opportunity to view listings by time, by channel, according to a number of themes (e.g., movies, sports, children, etc.), or may allow the user to search for a listing by title. Program listings may be displayed using any suitable list, table, grid, or other suitable display construct. If desired, program listings display screens may also include selectable advertisement graphics, selectable advertisement banners, product brand logo graphics, service provider brand graphics, clocks, or any other suitable indicator or graphic.

Figure 6A:
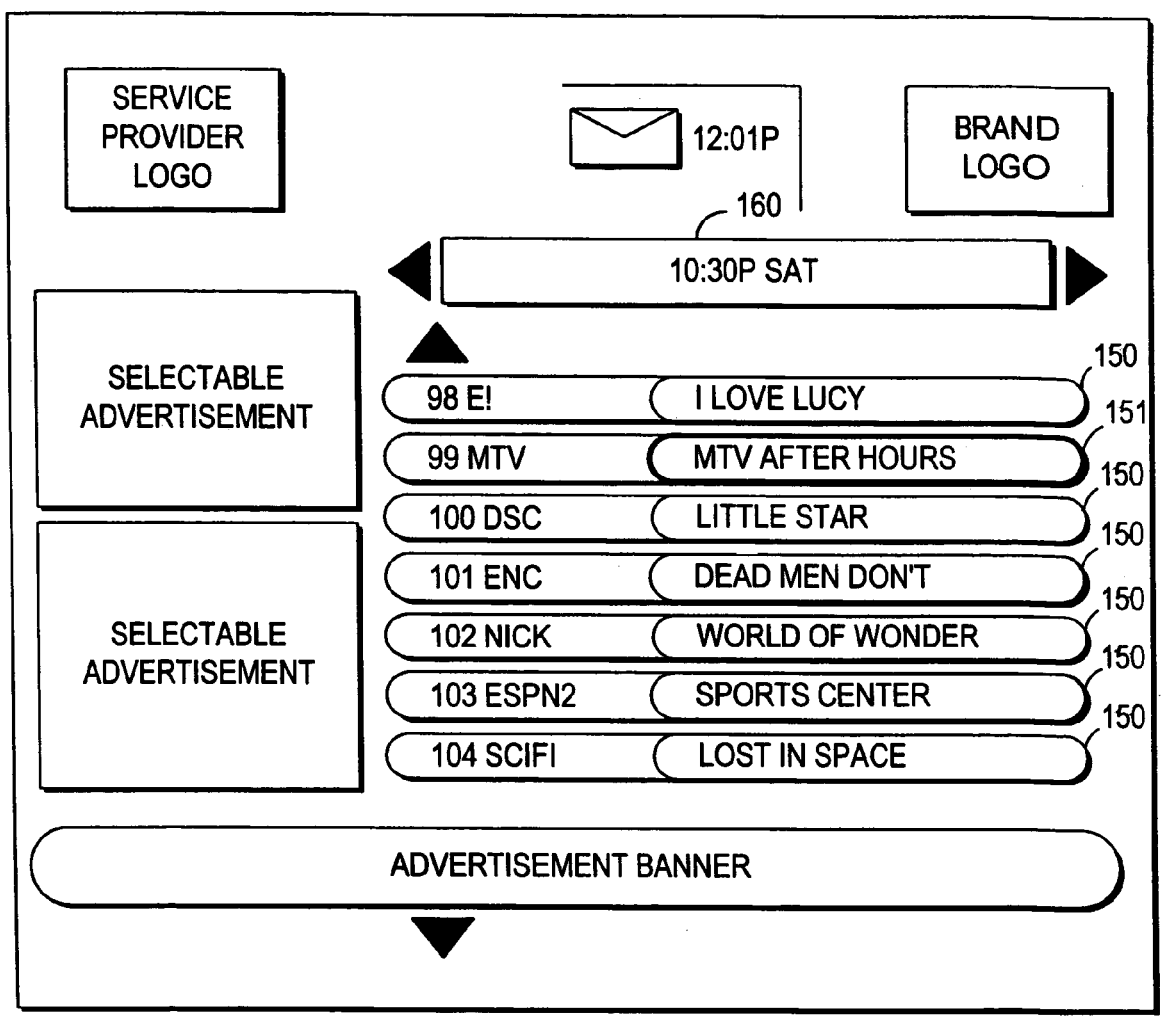
Figure 6B:
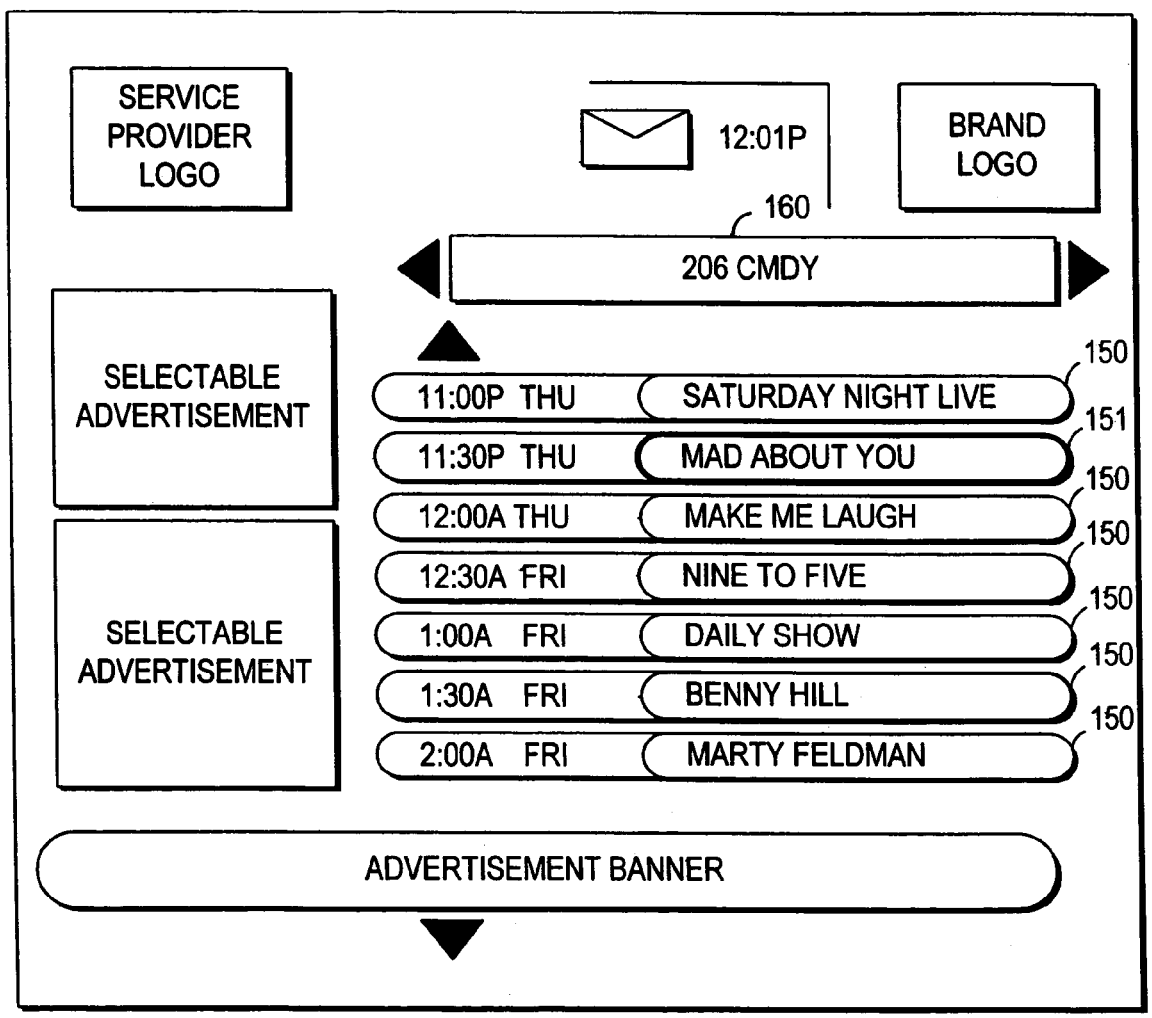

FIGS. 6*a* and 6*b* illustrate the display of program listings by time and by channel, respectively. The program listings display screens 130 and 135 of FIGS. 5*a* and 5*b* may include highlight region 151, which highlights the current listing 150. The user may position highlight region 151 by entering appropriate commands with user interface device 52. For example, if user input interface device 52 has a keypad, the user can position highlight region 151 using "up" and "down" keys. Alternatively, a touch sensitive screen, trackball, voice commands, or other suitable device may be used to move highlight region 151 or to select program listings without the use of highlight region 151. In still another approach, the user may speak a television program listing into a voice request recognition system. Any other suitable approach may be used.

The program guide may also provide the user with the opportunity to view listings for other times or channels. The user may indicate a desire to access listings for other times or channels by, for example, pressing "left" and "right" arrows on remote control 40 to change time slots (when listings are presented by time as shown in FIG. 6*a*), or to change channels (when listings are presented by channel as shown in FIG. 6*b*). In response to such an indication, the program guide may display listings for a different time slot or channel. The user may also indicate a desire to see additional program listings for a particular time slot (when listings are presented by time as shown in FIG. 6*a*) or for a particular channel (when listings are displayed by channel as shown in FIG. 6*b*) by, for example, pressing "up" and "down" arrow keys on remote control 40. In response to such an indication, the program guide may, for example, scroll or page the program listings to display additional program listings.

After a user selects a program listing (e.g., by position highlight region 151 and pressing an "OK" key on remote control 40), the interactive program guide may provide the user with the opportunity to access a number of program guide functions associated with the listing. For example, the user may access additional information (typically text or graphics, but possibly video and other information) about the listing, set a reminder, schedule an associated program for recording, set parental control features, set and navigate through favorite channels, or any access other suitable program guide function.

Figure 7A:
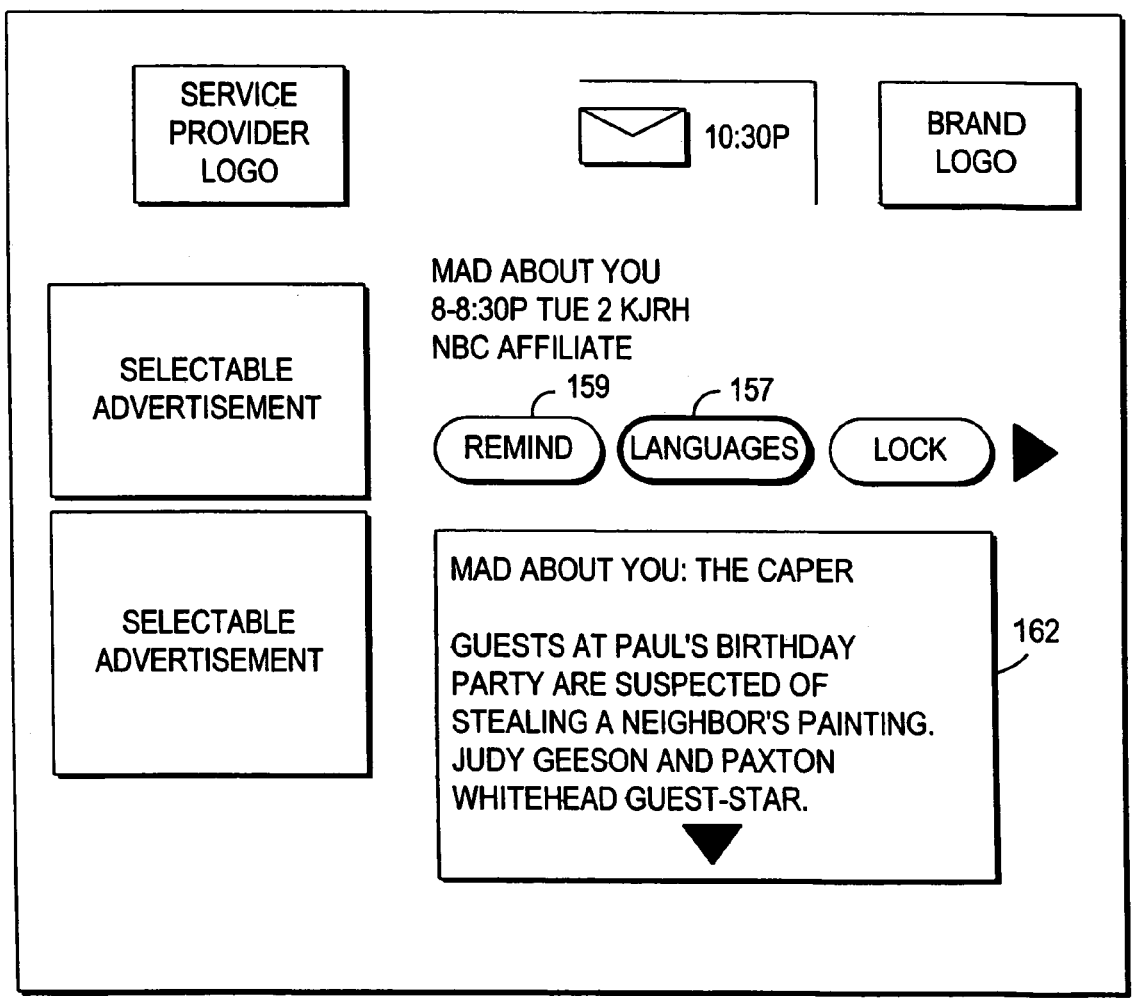
Figure 7B:
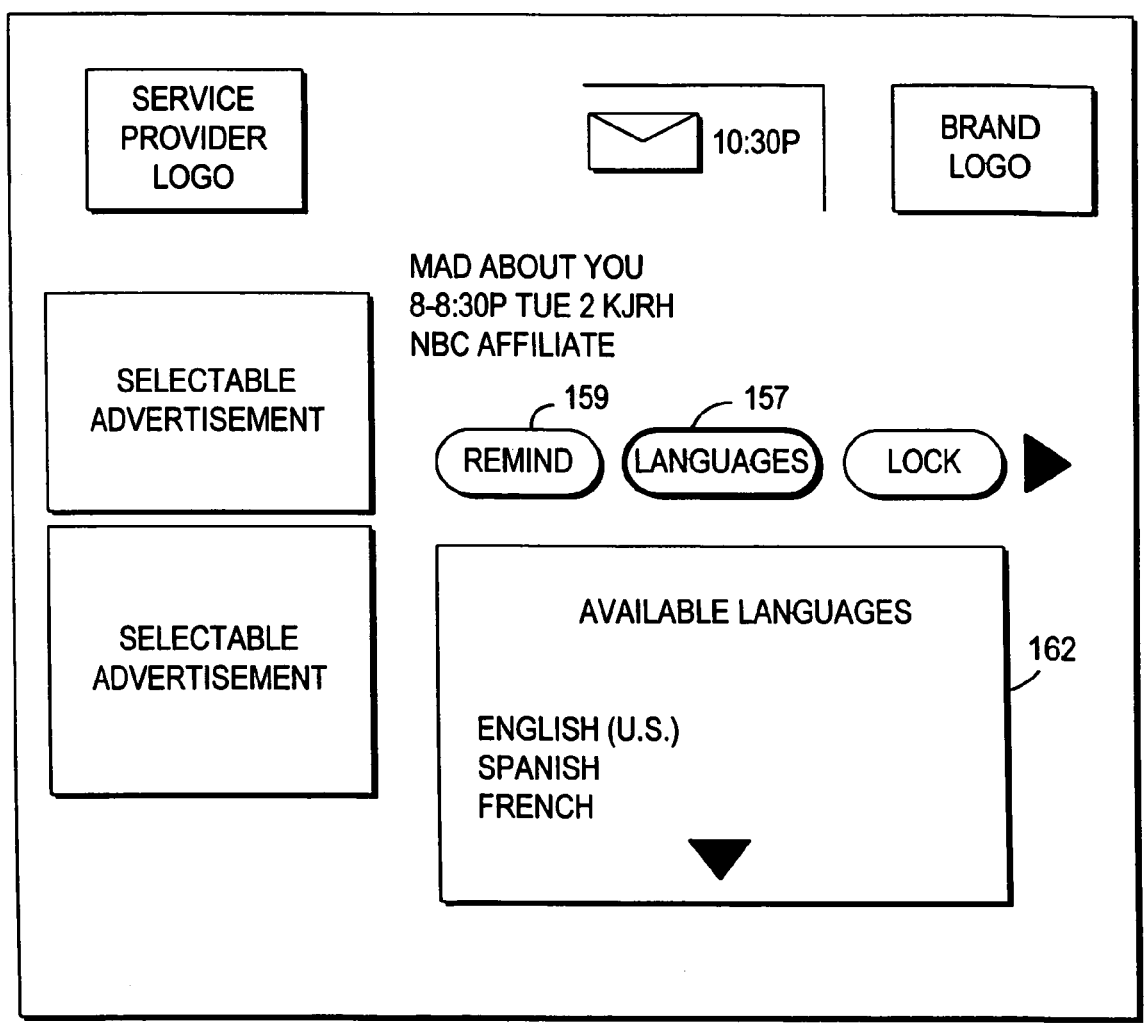

FIG. 7*a* shows an illustrative full information screen 161 that may be displayed when a user indicates a desire to view information for a program. Full information screen 161 may be displayed, for example, when the user presses an "info" key on remote control 40 after highlighting a program listing in a program listings display screen (e.g., program listings display screens 130 and 135 of FIGS. 5*a* and 5*b*), while watching a program, or at any other suitable time. Information screens that provide users with an opportunity to access various program guide functions are described, for example, in Rudnick et al. U.S. patent application Ser. No. 09/356,268, filed Jul. 16, 1999, which is hereby incorporated by reference herein in its entirety.

Full information screen 161 may include information window 162 in which a brief description of a program may be displayed. Information window 162 may also list the languages available for a program in response to a user indicating a desire to see such a list (e.g., by selecting language option 157). 7*b*, for example, shows information window 162 with available languages for "Mad About You." Alternatively, the available languages may be displayed as part of an information window without requiring a user to indicate a desire to access them.

Figure 8:
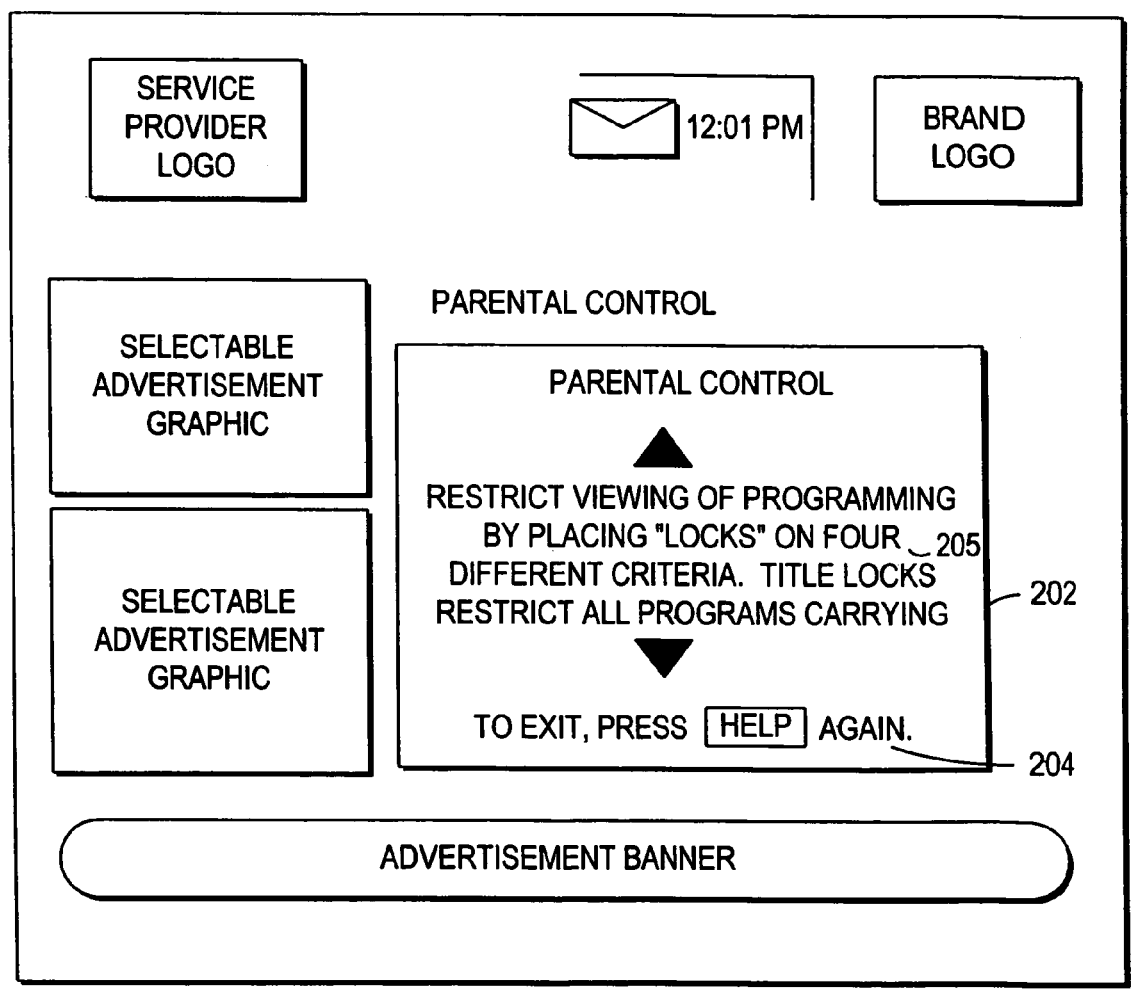

Users may be unfamiliar with some of the functions of the program guide. The interactive program guide may, for example, provide the user with the opportunity to access help information for a function by, for example, pressing a "help" key on remote control 40 while in the display screen of a particular function. FIG. 8 shows illustrative help display screen 200 that may be generated by the program guide in response to a user indication to do so. Help display screen 200 may contain selectable advertisement graphics, advertisement banners, product brand logo graphics, service provider logo graphics, clocks, or any other suitable indicator or graphic. Help display screen 200 may also contain help text panel 202 in which help text 205 is displayed. Help text panel 202 may include other non-help text, such as text 204 that indicates to the user to press HELP to exit.

Figure 9:
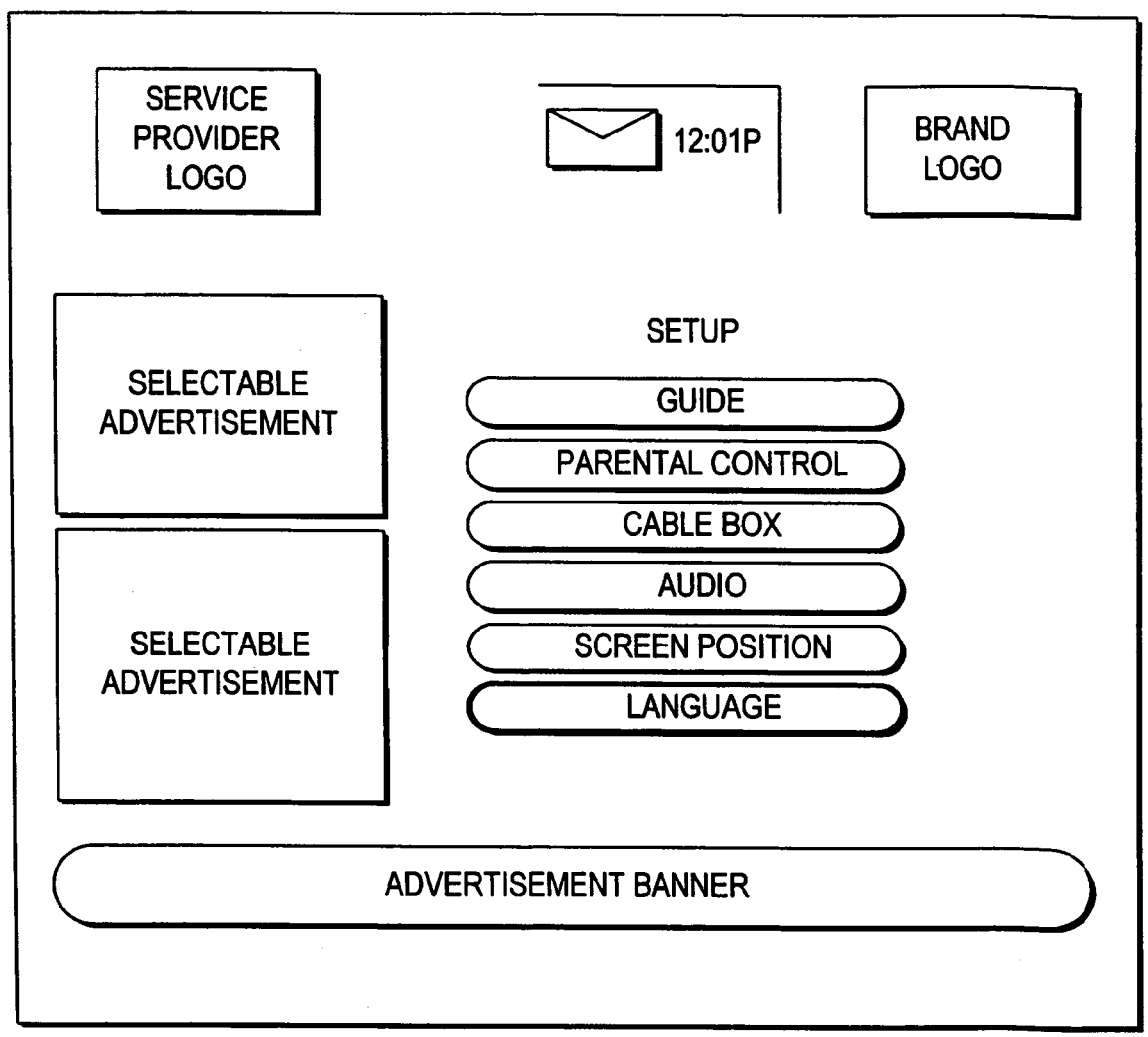

The program guide of the present invention may provide a user with the opportunity to select a language from a list of languages. The user may, for example, access a list of languages initially by indicating a desire to access a setup function of the program guide by selecting "SETUP" from main menu 102 of FIG. 5. In response to such an indication, the program guide may display a setup display screen, such as illustrative setup display screen 300 of FIG. 9. The setup display screen of FIG. 9 may, for example, provide a user with the opportunity to select a "language" setup option from a list of on-screen features.

Figure 10:
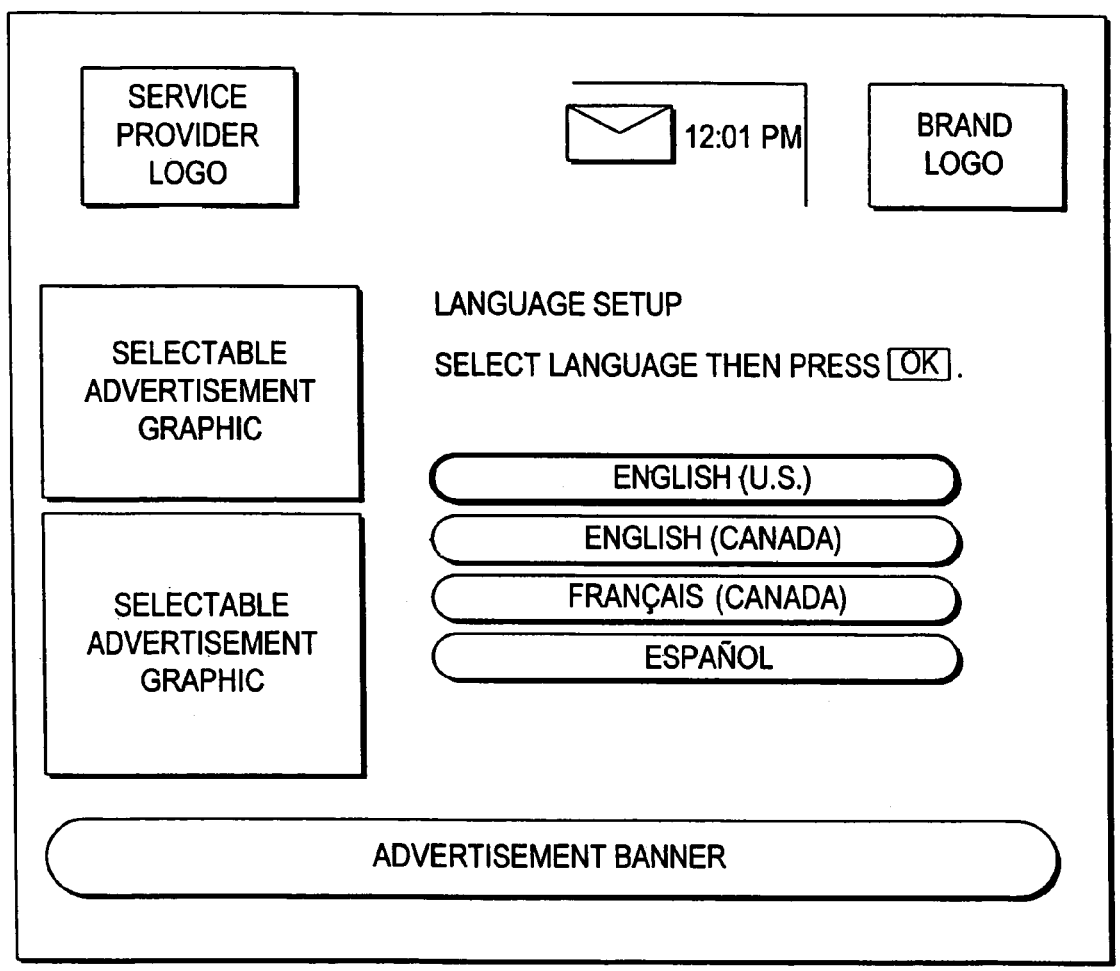

In response to the user selection of the "language" setup option the program guide may display, for example, illustrative language setup display screen 310 of FIG. 10. Language setup display screen 310 of FIG. 10 may, for example, display a list of selectable languages that the program guide may use for playing television programming and displaying program guide display screen text. The language listings may be displayed in their respective languages if desired. The program guide may provide the user with an opportunity to select a language and in response to such a selection, the program guide may display illustrative language confirmation screen 320 shown in FIG. 11. Language confirmation screen 320 of FIG. 11 may provide a user with an opportunity to confirm the selected language. If desired, language confirmation screen 320 may be displayed in the selected language before the language is set.

Figure 11:
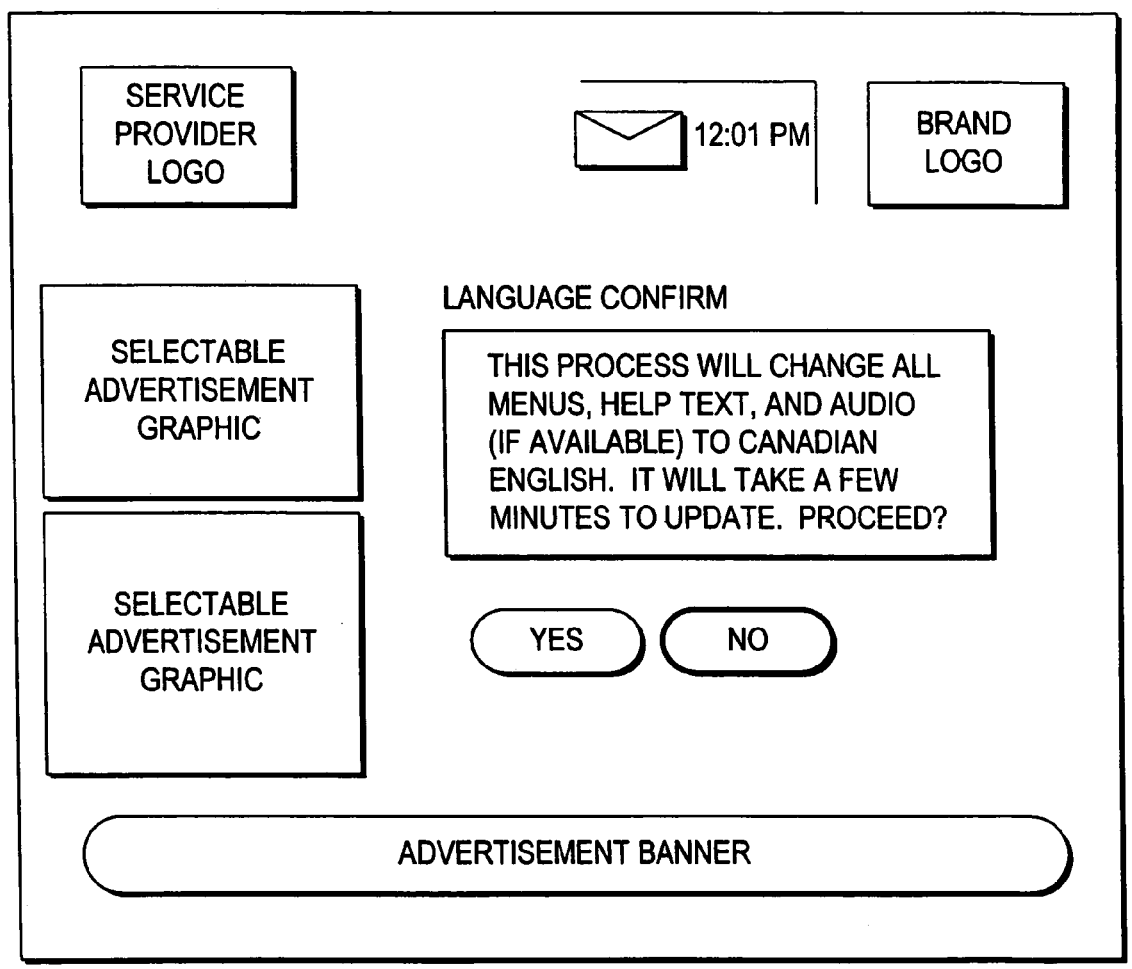

Illustrative language confirmation screen 320 of FIG. 11 indicates to users that there may be a delay of a few minutes to update the guide. Whether or not there is any delay may depend on the chosen approach for providing program guide display screen text in different languages. The message displayed in language confirmation screen 320 may be changed accordingly.

Language setup display screen 310 of FIG. 10 and language confirmation screen 320 of FIG. 11 may also be displayed by the program guide to provide the user with an opportunity to select an alternate language. The program guide may display program guide display screen text and play audio in the alternate language when text or audio in the primary language (i.e., the language first selected by the user) is not available. In another suitable approach, the program guide may pick an alternate language based on the primary language selected by the user. If the user selects Canadian English, for example, the program guide may select U.S. English as an alternate language. As used herein, "selected language" is intended to include a primary language selected by-the user, a secondary language selected by the user or the program guide, or any suitable combination thereof.

In practice, the languages available for playing programming audio may not be the same as the languages available for displaying program guide display screen text. When programming audio is not available in the selected language but program guide display screen text is, the program guide may play programming audio in a related language. For example, if a user selects Canadian English as the user's primary language, the program guide may display program guide display screen text in Canadian English and play programming audio in U.S. English when there is no Canadian English audio track available.

The program guide may store a language attribute identifying the selected language. The program guide may also store a default program guide language attribute identifying a default program guide language. The default program guide language attribute may, for example, be preprogrammed into the program guide or supplied as part of the program guide data, and may be customized based on a user's location. For example, users in the United States may have their default program guide language set to U.S. English, and users in Mexico may have their default program guide language set to Spanish.

Program guide display screen text may be displayed using the interactive television program guide according to the language attributes. If program guide display screen text in the selected language is not available, text in the default program guide language may be used to display program guide display screen text in the default program guide language. The display of program guide display screen text may include displaying times, dates, currencies, or parental ratings in formats particular to a selected language or country that uses a selected language. Program guide display screen text may include help text, program guide data text, and program guide text, or any suitable combination thereof. Help text is displayed in response to the user selection of a help feature such as text 205 of FIG. 8. Help text may be provided as part of the program guide data provided by the main facility, as part of the application, or using a suitable combination of approaches. Help text may, for example, be initially provided as part of the program guide and later downloaded when the user selects a language.

Program guide data text is text included in the program guide data that is read by the program guide and included in program guide display screens. Program guide data text may include, for example, programming information (e.g., titles, channels, descriptions and content information, rating information, or any other text based information associated with television programming), text for advertisements, or any other suitable text based information. An example of program guide data text may be the program listings of listings 150 shown in FIGS. 6a and 6b, and the program information displayed on information window 162 of FIG. 7a.

Program guide text is text that is programmed into the program guide and that is generally not provided as part of the program guide data. Program guide text may be downloaded, however, when the user changes languages. Program guide text may include, for example, screen titles, screen element labels (e.g., button labels, program list labels, program grid labels, etc.), text that indicates or otherwise describes program guide functionality, or any other text that may be considered part of the program guide itself for display in program guide display screens. An example of program guide text may be the text of selectable features 106 of main menu 102 (FIG. 5).

The interactive program guide may obtain program guide data containing text that is in the selected or default program guide languages. In one suitable approach, program guide help and data text may be provided continuously by television distribution facility 16 to user television equipment 22 in different languages and filtered by the interactive program guide. The program guide may, for example, filter out data in the data stream containing text that is not in a desired language (e.g., undesirable help or program guide data text) by, for example, comparing a stored language attribute with language attributes contained in a program guide data stream. This comparison and filtering may also be performed by suitable circuitry in control circuitry 42 without requiring the program guide to do the comparison. In another suitable approach, program guide data in the desired language (e.g., help text and programming video data text) may be downloaded by the program guide by a specific request (e.g., in a suitable client-server approach).

In still another suitable approach, the interactive program guide may indicate the selected and default program guide languages to television distribution facility 16 using any suitable approach. Television distribution facility 16, in turn, may provide program guide data only in the indicated languages. In this approach, television distribution facility 16 may have suitable memory and processing circuitry to store language attributes for a large number of users. Alternatively, the program guide may indicate the selected and default languages with every request.

Program guide text may be changed by the interactive program guide using any suitable approach. Program guide text for all available languages may, for example, be compressed Using any suitable compression method, and stored as part of the program guide application. When a user selects a different language, the program guide may, for example, decompress program guide text in the selected language and display it accordingly. Alternatively, the program guide may, for example, download program guide text on demand from the television distribution facility (e.g., as in a suitable client-server approach), or download program guide text from a periodic or continuous data stream.

Television program audio may be provided to user television equipment 22 by television distribution facility 16 on analog audio tracks of analog television channels. Different audio tracks may be used to provide different languages for television program audio. One suitable analog approach involves using a secondary audio program ("SAP"). SAP track identification may be provided to the interactive television program guide as part of the program guide data stream by main facility 12 or television distribution facility 16. The program guide data stream may, for example, contain a SAP track map database that maps or defines the primary and secondary language types of the SAP for a particular programming entity (e.g., by using a unique source identifier ("ID") to identify NBC, ABC, FOX, etc.), for each channel, or for each program. The SAP track map database may be generated by main facility 12 or television distribution facility 16 and transmitted to user television equipment 22 using any suitable analog or digital in-band or out-of-band approach. The SAP track map database may be included in the program guide data if desired.

The SAP track map database may be stored by the interactive program guide, downloaded on demand, periodically, continuously or using any other suitable approach. When necessary, the interactive program guide may pass track identifiers to analog audio selector 59 (FIG. 4). The program guide may, for example, pass track identifiers to analog audio selector 59 each time the user changes channels, each time a new program is broadcast, or after any other suitable event that may require analog audio selector 59 to select a different audio track. Alternatively, the program guide may pass the SAP track map database and track identifiers to analog audio selector 59. Analog audio selector 59 may in turn dynamically choose between the SAP audio tracks based on the language identifiers and the SAP map, without requiring- activity by the program guide.

Television program audio, data, and other information may be provided to user television equipment 22 on digital tracks that are provided as part of digital television channels. A digital channel may include, for example, a video track, a number of audio tracks, and a number of data or other suitable text tracks (e.g., a subtitle track, digital music information track (e.g., title, artist, and track information), etc.). If desired, data may be transmitted out-of-band and not included as an additional track. Digital video, audio, and data are transmitted in packets on the digital television channel. The packets also contain packet identifiers ("PIDs") identifying the track that each packet belongs to.

A PID map database may be provided by main facility 12 to television distribution facility 16 as part of the program guide data. Alternatively, television distribution facility 16 may insert a PID map database into the program guide data that was generated by television distribution facility 16 or another source. If desired, the PID map database may to user television equipment 22 separate from the program guide data. The PID map database defines which languages correspond to the digital tracks of the digital channels. The PID map database may define, for example, which languages correspond to which tracks for each television program, for each channel, or for each television distribution facility 16.

The interactive television program guide implemented on interactive program guide equipment 17 may receive the PID map database. The PID map database may be used by the interactive program guide to determine which audio, data, or other track has audio, data, or other information in the selected, default program guide, and default program languages. This may be determined, for example, each time the user changes the selected language, each time new television programming is broadcasted, each time the channel is changed, in any suitable combination thereof, or after any other event that may require selecting different digital tracks to obtain audio, data, or other information in the applicable languages. The PIDs for the tracks on which the selected or default language audio, data, or other information is provided are passed by the interactive program guide to packet filter 55 located in user television equipment 22. Packets without the passed IDs are filtered out by packet filter 55. The remaining packets, along with the digital video signal of the channel, may be passed from tuner 51 to decoder 57 for decoding, and all are played for the user by user television equipment 22.

The PID map database may also be forwarded to digital component selector 53. The interactive television program guide may pass the stored language attributes to digital component selector each time the user selects a different language using the program guide. Digital component selector 55 may in turn pass PIDs to the packet filter for audio, data, and other tracks that contain audio, data, and other information in the selected or default languages, based on the PID map. Packets without the indicated IDs are filtered out by packet filter. The remaining audio and data packets, along with the digital video signal on the channel, may be passed from tuner 51 to decoder 57 for decoding, and are all played for the user by user television equipment 22. In this approach, the interactive program guide may "sleep" and allow digital component selector 53 to detect events which would require sending different PIDs to packet filter 55 (e.g., the user flipping a channel).

If desired, only portions of the program guide display screen text may change by coordinating the language in which program guide display screen text is displayed with the languages available for television programming available to the user. A particular program may, for example, not have an audio track (digital or analog) for a primary selected language (e.g., U.S. English). The program may be played and its associated program listings and other information may be displayed, for example, in any other applicable language (e.g., an alternate, the default program language, or the default program guide language), while programs and associated program listings that have the desired audio track may be displayed in the primary selected language. The same may be true for subtitles, music information, programming information, other data or information included in digital tracks, or any other program guide display screen text that is presented to the user by the program guide.

A particular program may not, for example, have an audio track in the selected language. When the user indicates to the interactive program guide a desire to access a program guide function that involves, for example, displaying program guide data text (e.g., previewing program listings, program information, ordering pay-per-view programs, etc.), the program guide determines if the program guide data text displayed as part of the function includes television programming information (e.g., titles, broadcast times, descriptions and content information, rating information, etc.). As the program guide generates program guide display screens containing the television program information, the program guide determines if the television program associated with the television program information has audio, data, or other information in the selected language, based on the PID map database or the SAP map database. If so, the program guide displays program guide display screen text associated with the program in the selected language. If, however, the television program audio, data, or other information is not available in the selected language, the program guide may display the program guide display screen text in the default language.

In still another suitable approach, main facility 12 may provide program guide display screen text in those languages in which audio for related programming is available. If a program has audio in only one language, main facility 12 may only provide program guide display screen text in that language this may simplify the selection process that may take place at television distribution facility 12 when, for example, the program guide requests program guide data text.

One example of when the program guide may coordinate the language in which program guide display screen text is displayed with languages available for television programming is when a user indicates a desire to view program listings. The program guide may also coordinate languages, for example, when a user indicates a desire to access other program information, pay-per-view ordering information, or any other information related to television programs.

Figure 12:
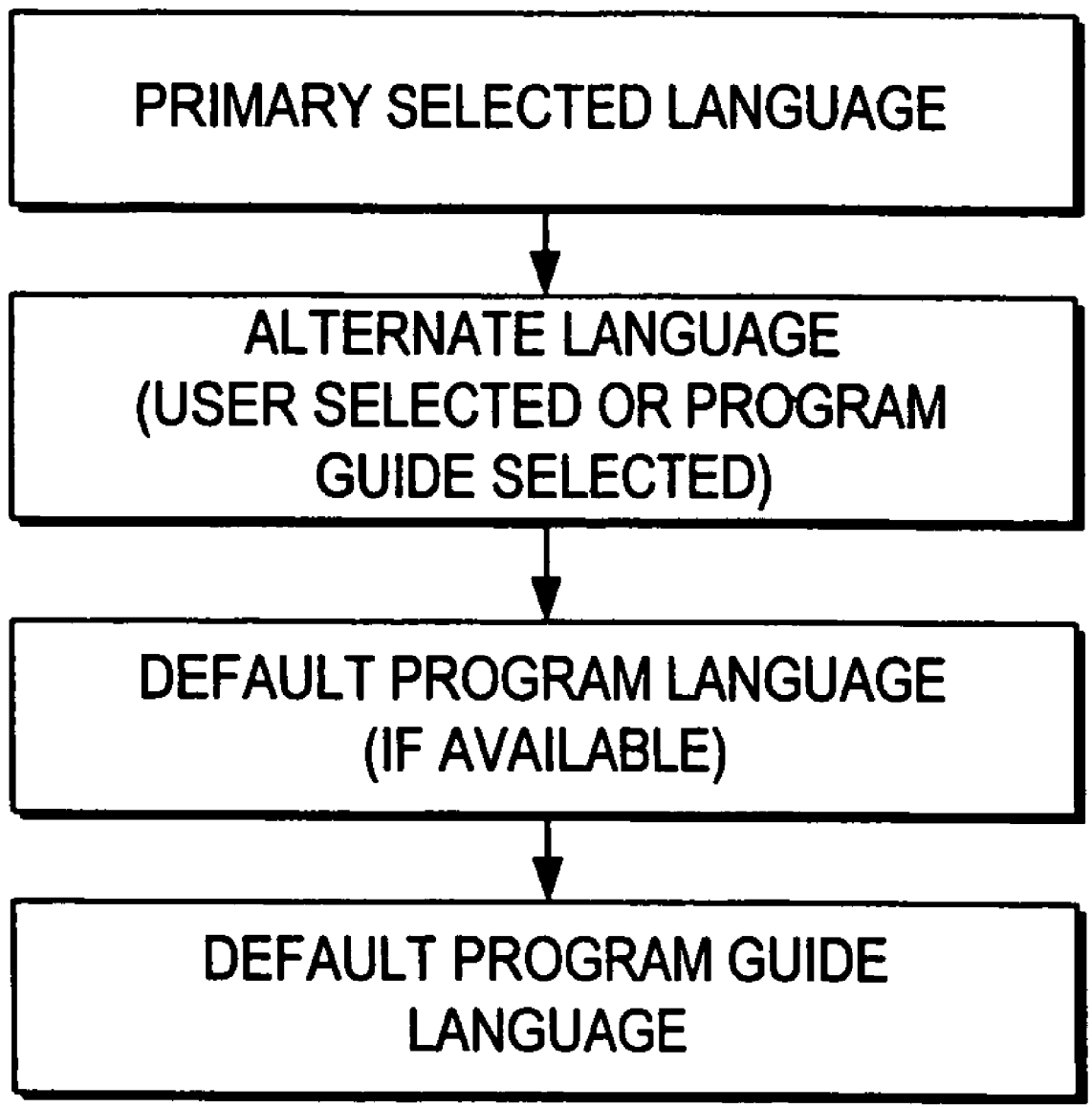
FIG. 12 shows an illustrative hierarchy that may be used by the program guide to determine the language in which program guide display screen text is displayed and audio played.

An illustrative hierarchy of the language in which program guide display screen text is displayed and audio played is shown in FIG. 12. Preferably, the program guide uses the primary language selected by the user. Program guide text and help text may normally be displayed in the primary language unless, for example, the text cannot be downloaded by the program guide after a user changes the primary language. If audio is not available, it may be played in an alternate language selected either by the user or by the program guide. If program guide data text is not available in the primary selected language, the program guide may obtain program guide data text in an alternate language selected by the user or by the program guide. Program guide data text for particular programs may be coordinated with the language in which audio will be played according, for example, to the hierarchy of FIG. 12.

Programs may have default program languages. A default program language may be set by, for example, main facility 12 or television distribution facility 16, and distributed to user television equipment 22 as part of the program guide data. If programming audio is not available in the primary or alternate language, it may be played in the default program language. Program guide data text for programs may be coordinated accordingly and displayed in the default program language. If none of the above languages are available, programming audio may be played and related program guide data text displayed in the default program guide language.

Figure 13:
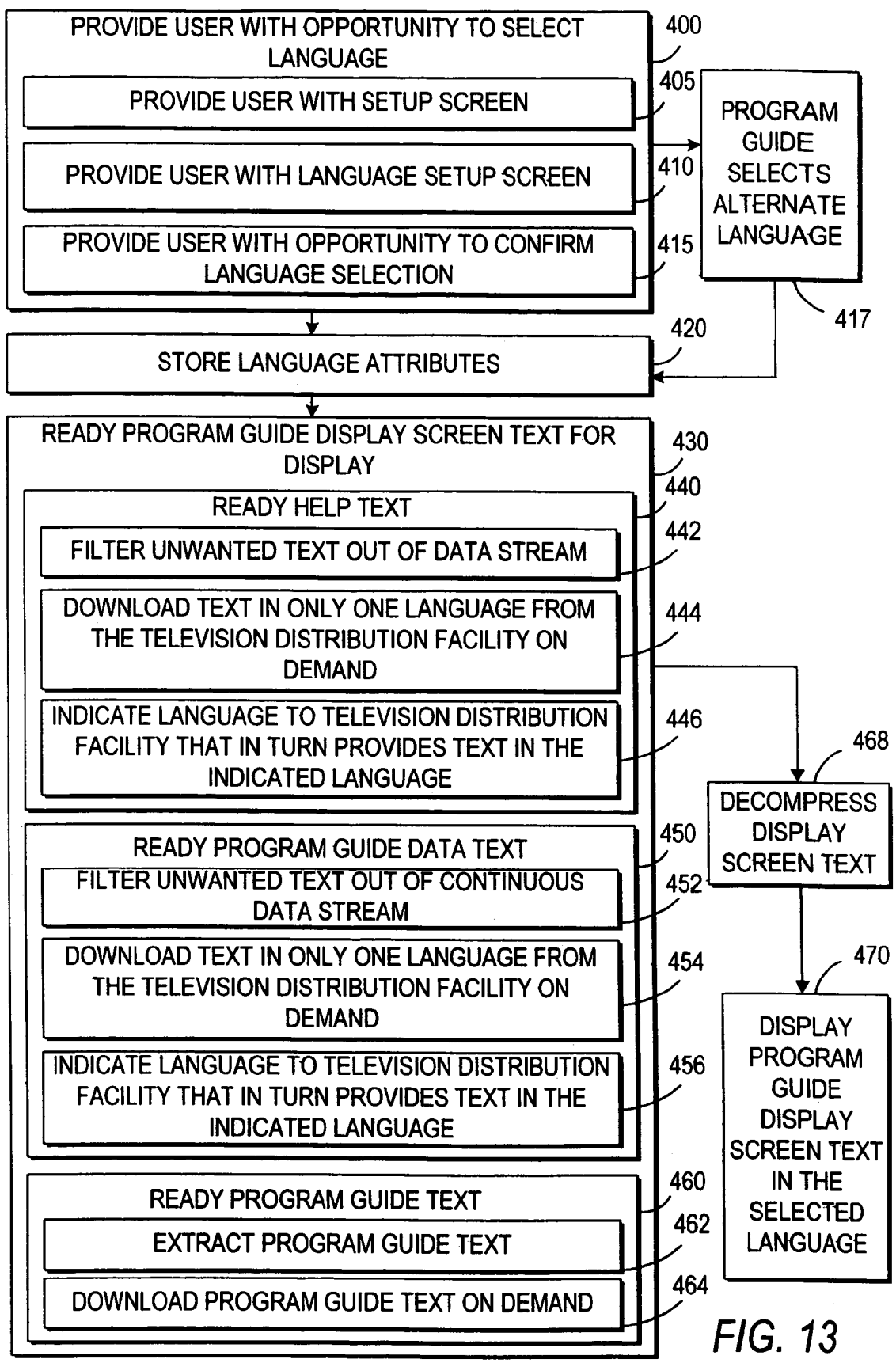
FIGS. 13-16 are flowcharts of illustrative steps involved in providing an interactive program guide with selectable languages in accordance with the principles of the present invention.

FIGS. 13-16 are flowcharts of illustrative steps involved in providing a program guide with selectable languages in accordance with the principles of the present invention. The steps illustrated in the flowcharts are illustrative and may be performed in any suitable order. FIG. 13 shows illustrative steps involved in operating an interactive television program guide system that provides a user with the opportunity to select languages in which program guide display screen text is displayed.

At step 400, the interactive program guide implemented on interactive program guide equipment 17 may provide the user with the opportunity to select a language. Step 400 may include substeps 405, 410, and 415 as shown. At substep 405, a setup screen, such as illustrative setup display screen 300 of FIG. 8, may be provided to the user to provide the user with the opportunity to access the language selection feature of the program guide. At substep 410, the program guide may provide the user with a language setup display screen, such as illustrative language setup display screen 410 of FIG. 10, to provide the user with the opportunity to select a language from a list of languages. At substep 415, the program guide may provide the user with the opportunity to confirm the language selection by, for example, providing the user with language confirmation screen 320 of FIG. 11. Step 400 may be repeated to provide the user with an opportunity to select an alternate language. Alternately, the program guide may select an alternate language according to the primary language (step 417).

The program guide may store language attributes for the selected languages at step 420. A language attribute for the default program guide language may have been pre-programmed into the program guide, or may also be stored at step 420 (e.g., by downloading it from a data stream or server). At step 430, the program guide may ready program guide display screen text for display in the-selected or default languages. More specifically, help text, program guide data text, and program guide text may be readied by the program guide at steps 440, 450, and 460, respectively.

Program guide display screen text may be readied by the program guide using any suitable approach. In practice, however, the way in which program guide display screen text is readied by the program guide may depend on the type of text and how the text is provided to the program guide. Help text and program guide data text may, for example, be continuously provided in multiple languages by television distribution facility 16 to user television equipment 22. Alternatively, help text and program guide data text in different languages may be provided on demand. In either of these approaches, the program guide may filter out unwanted help text or program guide data text at steps 442 and 452, respectively. Help text and program guide data text may also be downloaded in only the selected, default program guide, or default program languages by the program guide, as indicated by steps 444 and 454. In still another approach, the program guide may indicate the selected or default program guide language to television distribution facility 16. Television distribution facility 16 may in turn provide help text or program guide data text or any suitable combination of these approaches, continuously in the indicated language (steps 446 and 456). Help text and program guide text may, for example, be stored initially as part of the program guide and updated using a suitable client-server based approach.

In still another suitable approach, main facility 12 may provide program guide data text in those languages in which audio for related programming is available. If a program has audio in only one language, main facility 12 may only provide program guide data text in that language. This may simplify the selection process that may take place at television distribution facility 12 when, for example, the program guide requests program guide data text. Any other suitable approach for readying help text or program guide data text or any suitable combination of these approaches, may be used.

The program guide may ready program guide text at step 460. One suitable approach may involve extracting program guide text in the selected or default program guide language that is normally stored by the program guide (step 462). Another suitable approach may involve downloading program guide text from television distribution facility 16 on demand at step 460 using, for example, any suitable client-server or peer-to-peer approach (step 464). Any other suitable approach for readying program guide text may be used. At step 468, the display screen text may be decompressed. Providing display screen text in compressed form may tend to minimize the bandwidth requirements of link and 20 and the memory requirements of user television equipment 22.

At step 470, the program guide displays the program guide display screen text in the selected, the default program guide, or the default program language using user television equipment 22. Displaying program guide display screen text in a selected language may also include displaying text in a date format, time format, currency format, parental rating format or other format particular to a selected language or country that uses a selected language.

Figure 14:
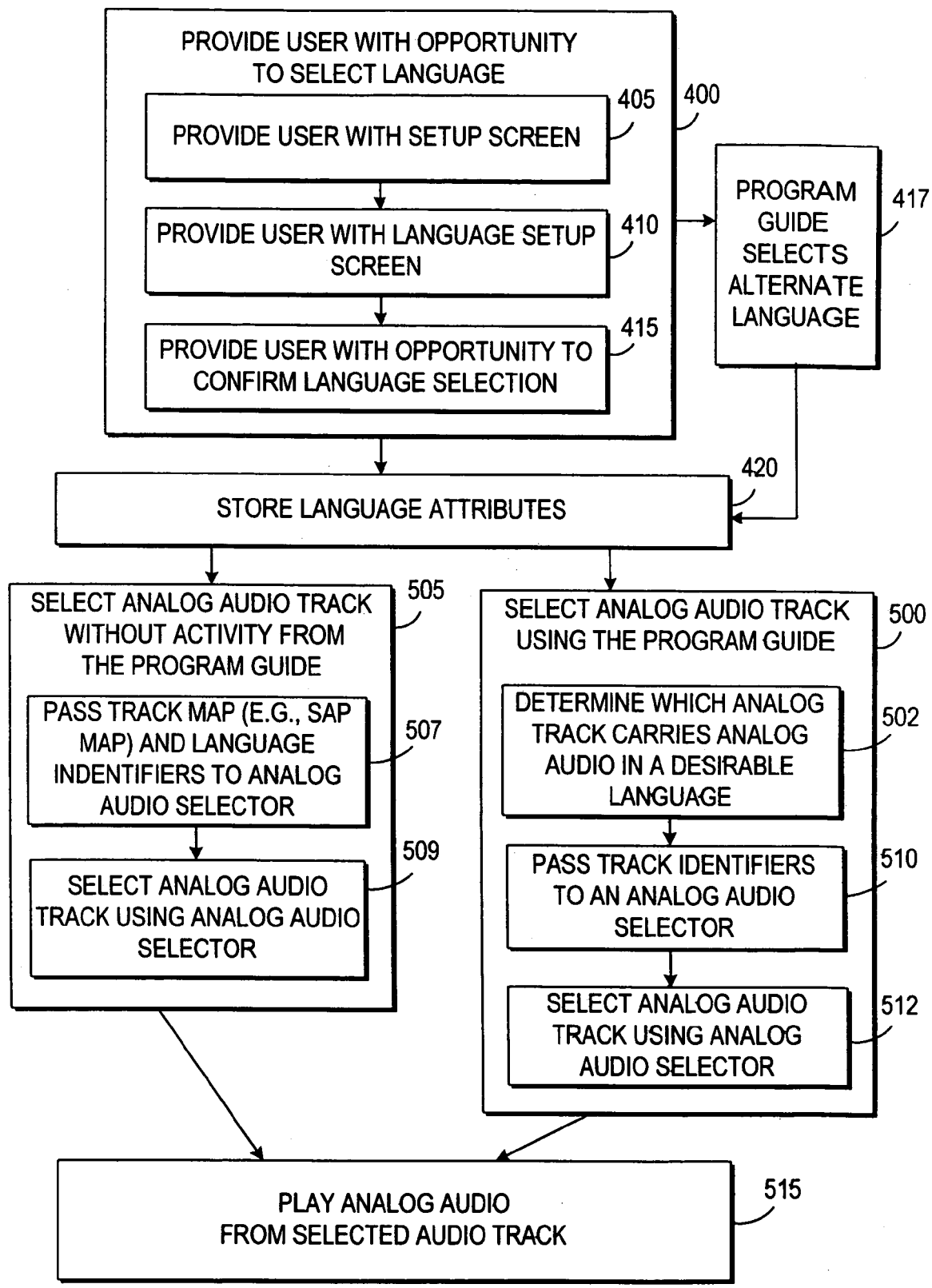

FIG. 14 is a flowchart of illustrative steps involved in providing analog audio on different analog audio tracks using the program guide of the present invention. Initially, the program guide may provide the user with an opportunity to select a language in which the user would like television program audio played by user television equipment 22. This opportunity may be provided to the user by the program guide at 400-415. At step 420, the program guide may store language attributes for the selected or default languages. Steps 400-420 were discussed with respect to FIG. 13 and for brevity will not be re-explained here.

An analog audio track is selected using the program guide (step 500). At step 502, the program guide may determine which analog track carries audio in a desirable language (e.g., the primary, alternate, default program guide, or default program language) using, for example, an analog audio track map such as a SAP map. At step 510, the program guide may pass an analog track identifier for the desired track to analog audio selector 59 (FIG. 4). This step may occur with any suitable frequency. The program guide may pass an analog track identifier to analog audio selector 59, for example, each time the user changes channels, each time a programming change occurs, or with any other suitable frequency. At step 512, the identified audio track is selected by analog audio selector 59. The selected audio track is played for the user by user television equipment 22 at step 515.

It may be desirable, however, to select analog audio tracks without activity from the program guide, as performed at step 505. This may involve, for example, passing an analog track map and language identifiers for the selected and default languages to analog audio selector 59 using the program guide (step 507). Analog audio selector 59 may determine which analog track is desirable based on the analog track map and the language identifiers. In a system in which SAP is used, for example, only one language identifier need be included in the SAP map sent to analog audio selector because there are only two available tracks. If audio in the selected language is not available on the indicated track, then the other track may automatically be used. Alternatively, the SAP map may include the languages of both tracks.

At step 509, analog audio selector 59 selects the desirable analog audio track without any further activity by the program guide directed towards selecting analog audio. Step 509 may be performed, for example, each time the user changes channels, each time programming changes on a channel, or with any other suitable frequency. Analog audio from the selected track is played by user television equipment 22 at step 515.

Figure 15:
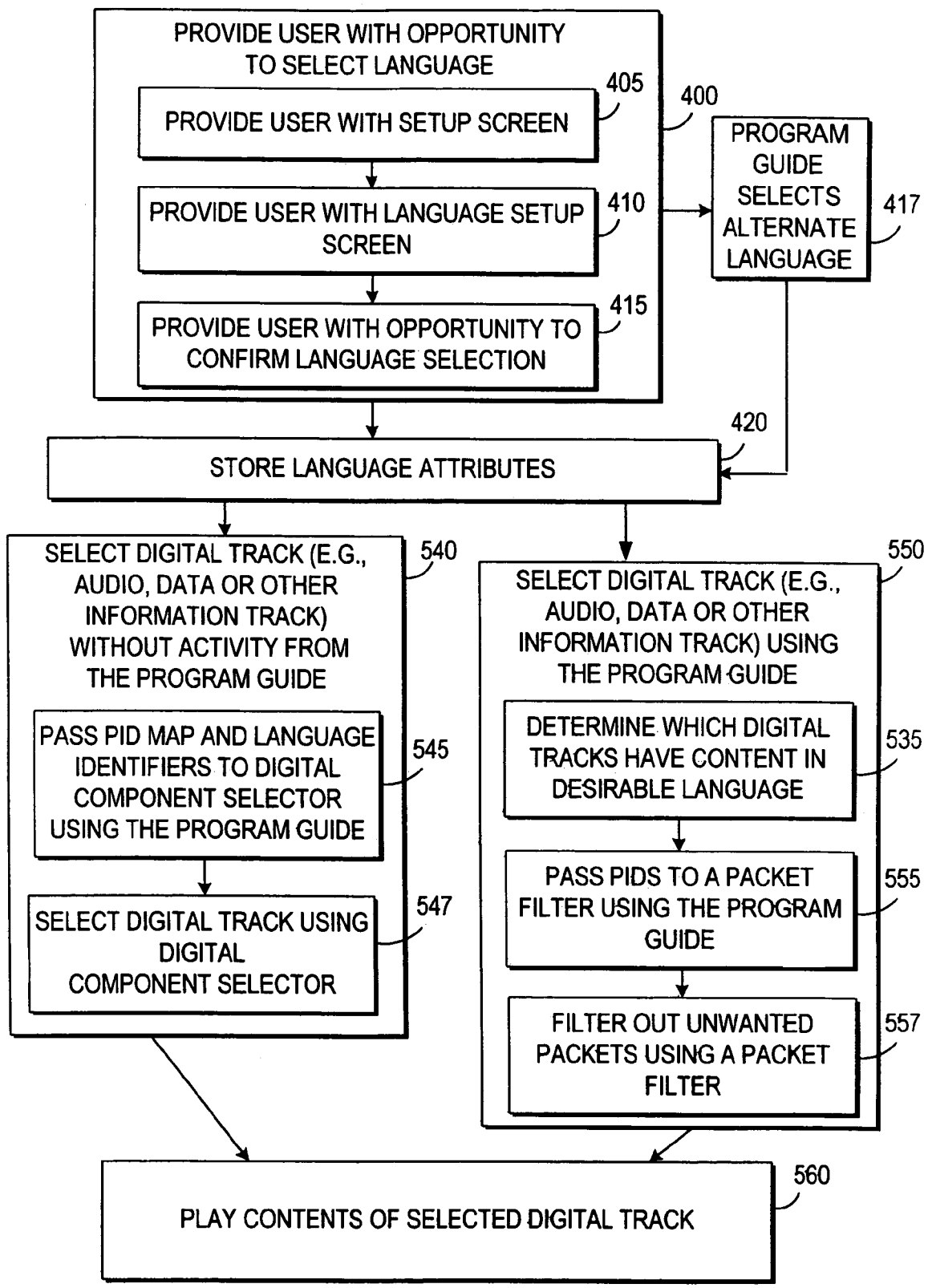

FIG. 15 is a flowchart of illustrative steps involved in providing digital audio, data, or other information using the program guide of the present invention. Initially, the program guide may provide the user with an opportunity to select a language. This opportunity may be provided to the user by the program guide at steps 400-415. At step 417, the program guide may select an alternate language based on the primary language. At step 420, the program guide may store language attributes for the selected and default program guide languages. Steps 400-420 were discussed with respect to FIG. 13 and for brevity will not be re-explained here.

A digital audio, data, or other information track is selected using the program guide at step 550. At step 552, the program guide determines which digital tracks carry audio, data, or other information in a desirable (the selected or default) language using, for example, a PID map. At step 555, PIDs for the desirable tracks may be passed to packet filter 55 (FIG. 4) using the program guide. This step may be performed with any suitable frequency. The program guide may pass PIDs to packet filter 55, for example, each time the user changes channels, each time a programming change occurs, or with any other suitable frequency. At step 557, packet filter 55 filters out unwanted packets and the contents of the selected tracks are played by user television equipment 22 at step 560.

It may be desirable, however, to select digital tracks without activity from the program guide directed towards digital track selection, as performed at step 540. This may involve, for example, passing a PID map and language identifiers for the selected and default languages to digital component selector 53 (FIG. 4) using the program guide (step 545). Digital component selector 53 may determine which tracks are desirable based on the PID map and the language identifiers, and may select the desirable tracks at step 547. Selecting desirable tracks may involve, for example, passing PIDs to packet filter 55 which, in turn, filters out undesirable packets. The contents of the selected digital tracks are played by user television equipment 22 at step 560.

Figure 16:
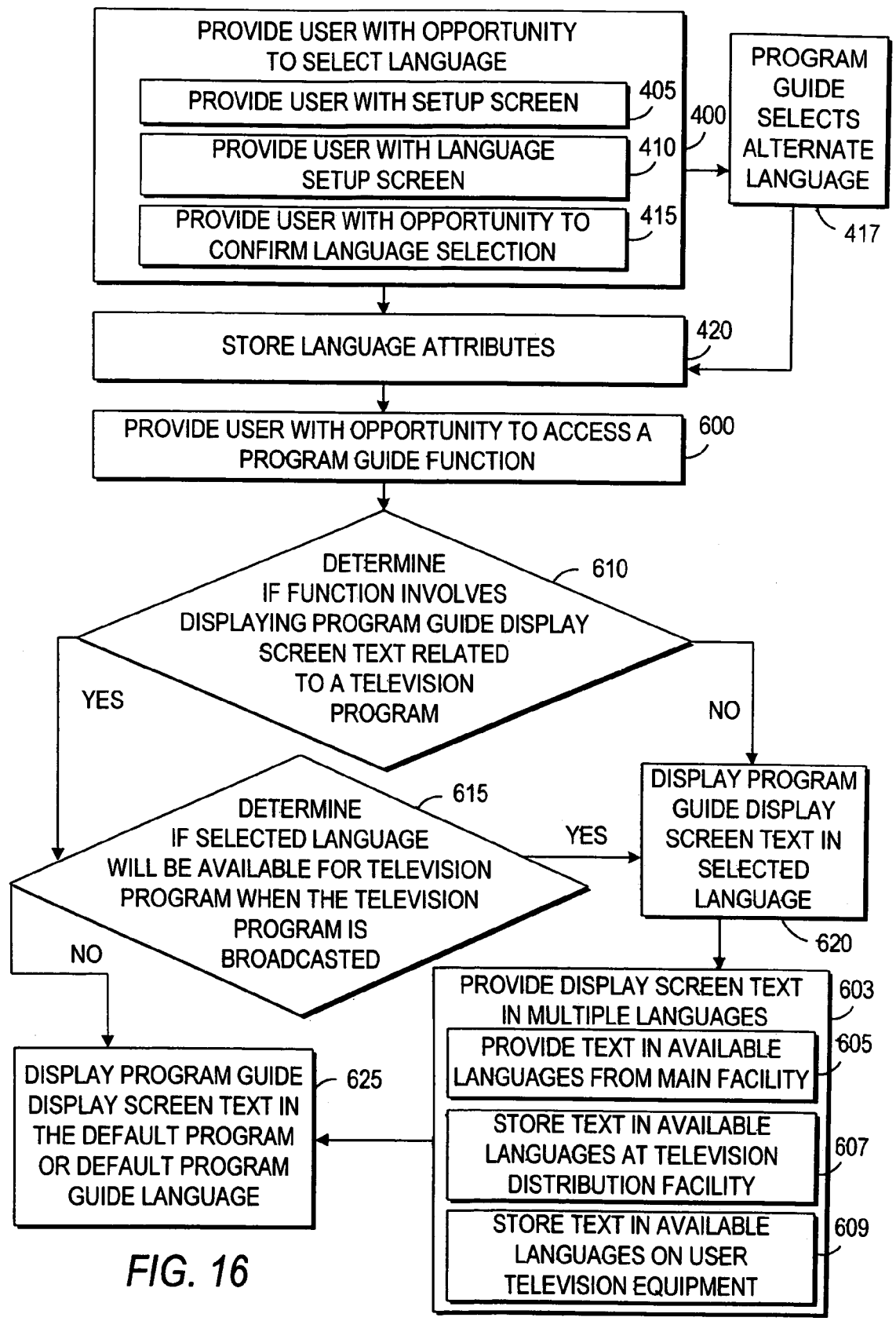

FIG. 16 is a flowchart of illustrative steps involved in coordinating the language in which program guide display screen text is displayed with languages available for television programming when the television programming is broadcasted. Initially, the program guide may provide the user with an opportunity to select a language. This opportunity may be provided to the user by the program guide at steps 400-415. At step 417, the program guide may select an alternate language based on the primary language. At step 420, the program guide may store language attributes for the selected and default languages. Steps 400-420 were discussed with respect to FIG. 13 and for brevity will not be re-explained here.

Coordinating display screen text with available languages may involve any suitable scheme for providing display screen text in one or more languages (step 603). Main facility 12 may only provide program guide display screen text in languages in which audio is available for programs (step 605). For example, main facility 12 may only provide program listings in the languages in which their associated programs have audio. Alternatively, distribution equipment 21 or program guide server 25 of television distribution facility 16 may only store program guide display screen text in languages available for programs (step 607). In still another approach, user television equipment 22 may only store program guide display screen text in languages available for programs (step 609).

At step 600, the program guide provides the user with an opportunity to access a program guide function. This may involve, for example, displaying main menu screen 100 of FIG. 5 and providing the user with the opportunity to select one of selectable features 106 (FIG. 5). Once the user indicates a desire to access a particular function (by, for example, selecting a feature 106), the program guide determines if providing the function to the user involves displaying program guide display screen text that is related to a television program (step 610). This may be accomplished, for example, by programming the program guide to recognize that certain fields in which program guide data text is displayed involve displaying television program related information, such as by examining an attribute associated with each field. Television program related information may include, for example, program listing information, additional program information, music information, pay-per-view ordering information, or any other information related to basic, premium, pay-per-view, music, or other types of programs. If the program guide function does not involve displaying program guide display screen text that is related to a television program, the program guide may display the program guide display screen text in the selected language at step 620. If program guide display screen text is not available in the selected language, then the program guide may display the text, for example, in accordance with the illustrative hierarchy shown in FIG. 13.

If the program guide determines at step 610 that the program guide function does involve displaying program guide display screen text that is related to a television program, the program guide may then determine if a selected (primary or alternate) language is a language that is associated with the television program; that is, the program guide determines if the selected language is one of the languages that the audio, data, or other information for a television program will be broadcasted in. This may be accomplished, for example, by examining a track map database that is provided as part of the program guide data stream (e.g., a SAP track map database, a PID map database, etc.).

How the program guide determines whether a television program will be broadcasted with audio, data, or other information in a selected language may depend on how the track map database is structured. If, for example, the track map database associates available languages with channel numbers, the program guide may cross-reference the channel number for the television program as indicated in the program guide data stream with the channel numbers in the track map database. Alternatively, if the track map database associates available languages with individual programs, the program guide may cross-reference the program name (or other program identifier) with the program names (or identifiers) in the track map database.

A particular program guide function may include displaying program guide display screen text that relates to a number of television programs. Providing the user with program listings information, such as is displayed in program listings screens 130 and 135 of FIGS. 6a and 6b, is an example of such a function. When generating screens 130 or 135, for example, the program guide may perform step 615 for each listing and determine that each listing 150 is a field in which program guide display screen text is displayed that relates to a television program. The program guide may determine if each program that is associated with each listing 150 will be broadcasted with audio, data, or other information in the selected language by, for example, cross referencing each listing with the contents of the track map database.

If the program guide determines that a television program will be broadcasted with audio, data, or other information in a selected language, the program guide may display the program guide display screen text that is related to that television program in the selected language, as indicated by step 620. If, however, the program guide determines that the television program will not be broadcasted with audio, data, or other information in one of the selected languages, the program guide will display the program guide display screen text related to the television program in the default program language, or the default program guide language as indicated by step 625.

Steps 620 and 625 may be performed for each program guide display screen display element such as, for example, each listing 150 of program listings screens 130 and 135 of FIGS. 6a and 6b. It should be further noted that displaying program guide display screen text in the selected or the default languages may require first readying the program guide display screen text, as discussed with respect to FIG. 13.

The foregoing is merely illustrative of the principles of this invention and various modifications can be made by those skilled in the art without departing from the scope and spirit of the present invention.

What is claimed is:

1. A method for providing access to media programs with content distributed by a server in multiple languages using an interactive program guide, the method comprising:
   providing a user with a first selection opportunity to select a language for interacting with the interactive program guide;
   communicating to the server the language selected by the user;
   providing the user with a second selection opportunity to select a program for viewing using the interactive program guide, wherein the program has a plurality of associated tracks having content in at least two different languages, wherein each track is associated with a single language, and wherein the first and the second selection opportunities are separate selection opportunities; and
   in response to the second selection opportunity, receiving from the server a transmission including only a track associated with the selected program having content in a language selected by the user.

2. The method of claim 1, wherein the first selection opportunity occurs before the second selection opportunity.

3. The method of claim 2, wherein the language selected by the user is stored in a memory of user equipment.

4. The method of claim 2, wherein the language selected by the user is stored in a memory of the server.

5. The method of claim 1, wherein program guide display screen text is displayed on user television equipment in the language selected by the user.

6. The method of claim 1, wherein the server is a television distribution facility.

7. The method of claim 1, wherein the program is a video-on-demand program with a plurality of associated tracks having content in at least two different languages.

8. The method of claim 1, wherein tracks in languages other than the language selected by the user are not transmitted to the user.

9. The method of claim 1, wherein tracks in languages other than the language selected by the user have been removed prior to transmission.

10. The method of claim 1, further comprising:
   providing the user with a selection opportunity to select an alternate language for interacting with the interactive program guide; and
   wherein the receiving from the server a transmission comprises receiving from the server a transmission including only a track associated with the selected program having content in the alternate language when a track associated with the selected program having content in the language selected by the user is unavailable.

11. A system for providing access to media programs with content distributed by a server in multiple languages, the system comprising:
   interactive program guide equipment having user television equipment;
   an interactive program guide implemented on the interactive program guide equipment, wherein the interactive program guide equipment is configured to:
      provide a user with a first selection opportunity to select a language for interacting with the interactive program guide;
      communicate to the server the language selected by the user;
      provide the user with a second selection opportunity to select a program for viewing using the interactive program guide, wherein the program has a plurality of associated tracks having content in at least two different languages, wherein each track is associated with a single language, and wherein the first and the second selection opportunities are separate selection opportunities; and
      in response to the second selection opportunity, receive from the server a transmission including only a track associated with the selected program having content in a language selected by the user.

12. The system of claim 11, wherein the first selection opportunity occurs before the second selection opportunity.

13. The system of claim 12, wherein the language selected by the user is stored in a memory of the interactive program guide equipment.

14. The system of claim 12, wherein the language selected by the user is stored in a memory of the server.

15. The system of claim 11, wherein program guide display screen text is displayed on user television equipment in the language selected by the user.

16. The system of claim 11, wherein the server is a television distribution facility.

17. The system of claim 11, wherein the program is a video-on-demand program with a plurality of associated tracks having content in at least two different languages.

18. The system of claim 11, wherein tracks in languages other than the language selected by the user are not transmitted to the user.

19. The system of claim 11, wherein tracks in languages other than the language selected by the user have been removed prior to transmission.

20. The system of claim 11, wherein the interactive program guide equipment is further configured to:

provide the user with a selection opportunity to select an alternate language for interacting with the interactive program guide; and receive from the server a transmission including only a track associated with the selected program having content in the alternate language when a track associated with the selected program having content in the language selected by the user is unavailable.

* * * * *